United States Patent
Ben-Lavi et al.

(10) Patent No.: US 10,276,075 B1
(45) Date of Patent: Apr. 30, 2019

(54) DEVICE, SYSTEM AND METHOD FOR AUTOMATIC CALIBRATION OF IMAGE DEVICES

(71) Applicant: CHRISTIE DIGITAL SYSTEMS USA, INC., Cypress, CA (US)

(72) Inventors: Eliezer Azi Ben-Lavi, Waterloo (CA); Andrew Douglas Dennison, Breslau (CA); Nicholai Alexander Peter Wasilka, Kitchener (CA)

(73) Assignee: CHRISTIE DIGITAL SYSTEM USA, INC., Cypress, CA (US)

( * ) Notice: Subject to any disclaimer, the term of this patent is extended or adjusted under 35 U.S.C. 154(b) by 0 days.

(21) Appl. No.: 15/936,925

(22) Filed: Mar. 27, 2018

(51) Int. Cl.
| | |
|---|---|
| *H04N 5/64* | (2006.01) |
| *G09G 3/00* | (2006.01) |
| *H04N 9/31* | (2006.01) |
| *G06T 7/80* | (2017.01) |
| *G06T 7/521* | (2017.01) |
| *G06K 9/32* | (2006.01) |

(52) U.S. Cl.
CPC ........... *G09G 3/001* (2013.01); *G06K 9/3241* (2013.01); *G06T 7/521* (2017.01); *G06T 7/80* (2017.01); *H04N 9/3185* (2013.01); *H04N 9/3194* (2013.01); *G06T 2207/10028* (2013.01); *G06T 2207/20041* (2013.01)

(58) Field of Classification Search
CPC .................................................. H04N 9/3147
USPC .... 348/744–747; 353/28, 29, 30, 40, 46, 69, 353/94
See application file for complete search history.

(56) References Cited

U.S. PATENT DOCUMENTS

| | | | | |
|---|---|---|---|---|
| 6,755,537 B1 * | 6/2004 | Raskar | ..................... | H04N 5/74 348/383 |
| 6,917,702 B2 * | 7/2005 | Beardsley | ................. | G06T 7/85 345/419 |
| 6,985,620 B2 * | 1/2006 | Sawhney | ................ | G01S 5/163 345/419 |
| 7,131,733 B2 * | 11/2006 | Shibano | ................. | G03B 37/04 353/94 |
| 7,854,518 B2 * | 12/2010 | Culbertson | .......... | H04N 9/3194 345/619 |

(Continued)

OTHER PUBLICATIONS

Hartley, Richard, et al. "Epipolar Geometry and the Fundamental Matrix", from "Multiple View Geometry in Computer Vision", Cambridge University Press, (2000, 2003), pp. 239-309.

*Primary Examiner* — Jefferey F Harold
*Assistant Examiner* — Humam M Satti
(74) *Attorney, Agent, or Firm* — Perry + Currier, Inc.

(57) ABSTRACT

A device, system and method for automatic calibration of image devices is provided. Triplets of at least three image devices, including a projector, are in non-collinear arrangements, and pairs of the image devices have overlapping fields of view on a physical object. Pixel correspondences between the pairs are used to determine relative vectors between the image devices. Relative locations between each of the image devices are determined based on the relative vectors with a relative distance between one pair of the image devices is to an arbitrary distance, the relative locations being further relative to a cloud-of-points representing the object. A model of the object and the cloud-of-points are aligned to transform the relative locations of each of the image devices to locations relative to the model. The projector is controlled to project onto the object based at least on the locations relative to the model.

20 Claims, 13 Drawing Sheets

(56) References Cited

U.S. PATENT DOCUMENTS

| | | | | |
|---|---|---|---|---|
| 7,901,093 B2* | 3/2011 | Tan | G03B 21/26 | 353/121 |
| 8,045,006 B2* | 10/2011 | Miceli | H04N 9/3194 | 348/189 |
| 8,944,612 B2* | 2/2015 | Chang | G03B 21/13 | 353/94 |
| 2002/0093631 A1* | 7/2002 | Melton | G02B 7/08 | 353/121 |
| 2005/0271299 A1* | 12/2005 | Ajito | G06T 3/005 | 382/293 |
| 2006/0159280 A1* | 7/2006 | Iwamura | H04L 12/66 | 381/79 |
| 2008/0089557 A1* | 4/2008 | Iwaki | G01C 3/06 | 382/106 |
| 2010/0204964 A1* | 8/2010 | Pack | G06T 7/521 | 703/1 |
| 2011/0080466 A1* | 4/2011 | Kask | G06T 5/006 | 348/43 |
| 2011/0206274 A1* | 8/2011 | Tateno | G06T 7/75 | 382/154 |
| 2013/0222386 A1* | 8/2013 | Tannhauser | G06T 11/60 | 345/428 |
| 2014/0035893 A1* | 2/2014 | Jackson | H04N 9/3147 | 345/207 |
| 2014/0212027 A1* | 7/2014 | Hallquist | G06F 3/1415 | 382/154 |
| 2014/0226167 A1* | 8/2014 | Smith | G03B 21/14 | 356/614 |
| 2015/0055099 A1* | 2/2015 | Kim | G03B 37/04 | 353/30 |
| 2015/0160539 A1* | 6/2015 | Bassi | G06T 7/80 | 353/69 |
| 2016/0378258 A1* | 12/2016 | Lyons | G06F 3/0488 | 345/175 |
| 2017/0103509 A1* | 4/2017 | Scharfenberger | H04N 9/3185 | |
| 2017/0142384 A1* | 5/2017 | Yoshimura | H04N 9/3147 | |
| 2017/0180689 A1* | 6/2017 | Morrison | H04N 9/3147 | |
| 2018/0268237 A1* | 9/2018 | Stanimirovic | G06K 9/2018 | |

* cited by examiner

DEVICE, SYSTEM AND METHOD FOR AUTOMATIC CALIBRATION OF IMAGE DEVICES

FIELD

The specification relates generally to projection mapping, and specifically to a device, system and method for automatic calibration of image devices.

BACKGROUND

Projection mapping, in a projection system, is often a very complicated process due to the careful alignment of projectors required to align numerous two-dimensional ("2D") projected images onto a three-dimensional ("3D") physical object. Hence, the pose of each of the projectors relative to the physical object needs to be calibrated, which is often performed using cameras acquiring images of the physical object as a projector is projecting calibration patterns (e.g. structured light patterns) onto the physical object. When the projectors and/or the physical object move relative to each other, the cameras may again be used to calibrate the poses of the projectors. However, for the cameras to be used to calibrate the projector locations, the poses of the cameras should also be known and/or calibrated. Camera calibration is generally performed using an odious manual set-up procedure, implemented by a technician operating the projection system to determine the camera poses. However, when the cameras move (e.g. due to weather conditions, people bumping into the cameras, etc.), technician will again need to manually calibrate the camera poses. Such a process is time consuming and, when a technician is not available, the projection may need to be at least temporarily shut down until a technician can visit the projection system to perform the calibration. Alternatively, in the place of cameras, light sensors may be mounted on and/or around an object onto which projection mapping is to occur and the light sensors may be used to calibrate the projectors.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
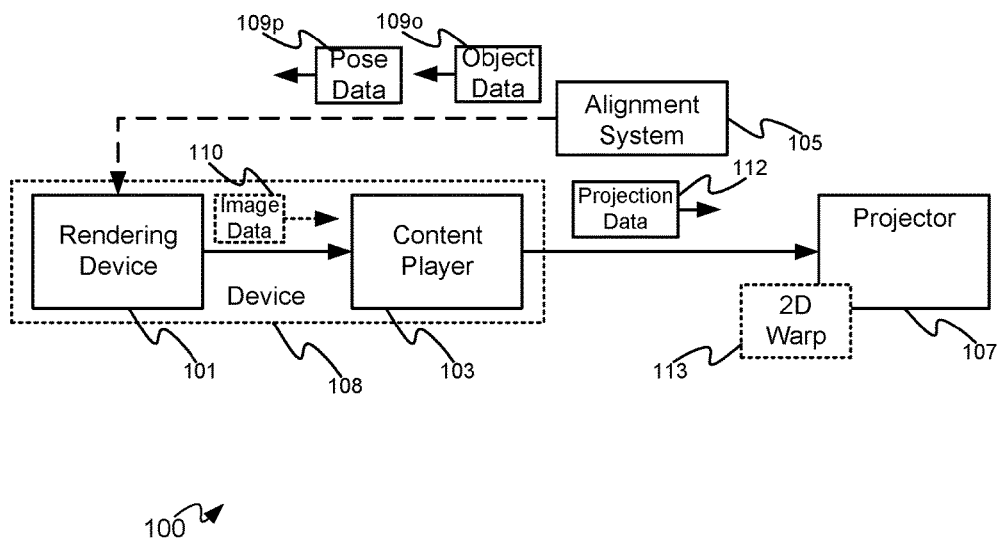
FIG. 1 depicts a projection system, according to non-limiting embodiments.

An aspect of the specification provides a system comprising: at least three image devices, with triplets of the at least three image devices in non-collinear arrangements, the at least three image devices including a projector configured to project onto a physical object, others of the at least three image devices each comprising a respective camera or a respective projector, wherein pairs of the at least three image devices have at least partially overlapping fields of view on the physical object; a memory storing a model of the physical object including physical dimensions thereof; and a controller configured to: determine respective pixel correspondences between the pairs of the at least three image devices as the projector is projecting structured light onto the physical object; determine a respective relative vector between a first pair of the at least three image devices using the respective pixel correspondences therebetween; determine respective relative vectors between further image devices, of the at least three image devices, and any two of the at least three image devices that share pixel correspondences with the further image devices and for which the respective relative vector has already been determined, until the respective relative vectors between all of the at least three image devices are determined; determine a respective relative location between each of the at least three image devices based on the respective relative vectors between the at least three image devices, setting a relative distance between one pair of the at least three image devices to an arbitrary distance, the respective relative location of each of the at least three image devices being further relative to a sensed cloud-of-points representing the physical object; align the model and the sensed cloud-of-points to transform the respective relative location of each of the at least three image devices to a respective location relative to the model; and cause controlling of the projector to project onto the physical object based at least on the respective location relative to the model of each of the at least three image devices.

Another aspect of the specification provides a method comprising: determining, at a computing device, respective pixel correspondences between pairs of at least three image devices as a projector, of the at least three image devices, is projecting structured light onto a physical object; triplets of the at least three image devices being in non-collinear arrangements, the at least three image devices including the projector configured to project onto the physical object, others of the at least three image devices each comprising a respective camera or a respective projector, and pairs of the at least three image devices having at least partially overlapping fields of view on the physical object; determining, at the computing device, a respective relative vector between a first pair of the at least three image devices using the respective pixel correspondences therebetween; determining, at the computing device, respective relative vectors between further image devices, of the at least three image devices, and any two of the at least three image devices that share pixel correspondences with the further image devices and for which the respective relative vector has already been determined, until the respective relative vectors between all of the at least three image devices are determined; determining, at the computing device, a respective relative location between each of the at least three image devices based on the respective relative vectors between the at least three image devices, setting a relative distance between one pair of the at least three image devices to an arbitrary distance, the respective relative location of each of the at least three image devices being further relative to a sensed cloud-of-points representing the physical object; aligning, at the computing device, a model of the physical object and the sensed cloud-of-points to transform the respective relative location of each of the at least three image devices to a respective location relative to the model, the model of the physical object including physical dimensions thereof; and causing, at the computing device, controlling of the projector to project onto the physical object based at least on the respective location relative to the model of each of the at least three image devices.

FIG. 1 depicts a system 100 comprising: a rendering device 101 (interchangeably referred to hereafter as the rendering device 101); a content player 103; an alignment system 105; and a projector 107. In general, the rendering device 101 is in communication with content player 103 and optionally alignment system 105, and content player 103 is in communication with projector 107.

As depicted, the rendering device 101 and the content player 103 are combined into one device 108, however in other implementations the rendering device 101 and the content player 103 can be separate devices. The alignment system 105 is configured to generate the pose data 109p comprising at least data defining geometric relationships between, for example, the projector 107 and objects onto which the projector 107 projects. Generally, the pose data 109p comprises a location of the projector 107 (e.g. in "x,y,z" coordinates relative to the object) and an orientation of the projector 107 (e.g. a "yaw", a "pitch" and a "roll" relative to the object). However, the pose data may also comprise intrinsic properties of the projector 107, such as lens characteristics, and the like.

The rendering device 101 can generate rendered image data 110 from the pose data 109p, for example by rendering existing image data (not depicted) for projection by the projector 107. In FIG. 1, solid lines connecting components show flow of image and/or video data there between, while the stippled line connecting the alignment system 105 to the rendering device 101 and/or device 108 shows flow of the pose data 109p and object data 109o there between. The object data 109o generally comprises a model of a location and orientation of the object onto which images from the projector 107 are projected, and can be provided with the object and/or determined by the alignment system 105 using one or more cameras.

When the rendering device 101 and the content player 103 are separate, the rendering device 101 communicates the image data 110 to the content player 103, which processes and/or "plays" the image data 110 by producing the projection data 112 suitable for processing and projection by the projector 107. For example, the image data 110 can include, but is not limited to, an AVI file, a series of JPG files, a PNG file, and the like. The projection data 112 can include, but is not limited to, HDMI data, VGA data, and/or video transport data.

When the rendering device 101 and the content player 103 are combined in device 108, device 108 can render the projection data 112 (e.g. video data) in real-time without producing the image data 110. In any event, the projection data 112 is communicated to the projector 107 by the content player 103 where the projection data 112 is used to control the projector 107 to project images based thereupon, for example onto a three-dimensional object.

The rendering device 101 generally comprises an image generator and/or renderer, for example a computing device, a server and the like, configured to generate and/or render images as the image data 110. Such the image data 110 can include, but is not limited to, still images, video and the like. Furthermore, though not depicted, the rendering device 101 can be in communication with, and/or comprise, an image generator and/or a memory storing data from which the image data 110 can be generated and/or rendered. Alternatively, the rendering device 101 can generate the image data 110 using algorithms, and the like, for generating images.

The content player 103 comprises a player configured to "play" and/or render the image data 110; for example, when the image data 110 comprises video data, the content player 103 is configured to play and/or render the video data by outputting the projection data 112 for projection by the projector 107. Hence, the content player 103 can include, but is not limited to a video player, a video processing device, a computing device, a server, and the like. However, as described above, when the rendering device 101 and the content player 103 are combined as device 108, rendering of the image data 110 can be eliminated and device 108 renders the projection data 112 without producing the image data 110.

The alignment system 105 comprises any suitable combination of projectors (including the projector 107), cameras (not depicted in FIG. 1), and computing devices configured to one or more of: automatically determine the pose data 109p of the projector 107; and optionally automatically determine the object data 109o. Non-limiting implementations of the alignment system 105 will be described below with reference to FIG. 2 to FIG. 13.

The projector 107 comprises a projector configured to project the projection data 112, including but not limited to a digital projector, a cinema projector, an LCOS (Liquid Crystal on Silicon) based projector, a DMD (digital micromirror device) based projector and the like. Furthermore, while only one the projector 107 is depicted, system 100 can comprise a plurality of projectors 107, each configured to project respective projection data comprising, for example, portions of larger tiled image to be projected. Regardless of a technology used in the projector 107, it is assumed that the projector 107, and/or other projectors described herein, includes an image modulator that includes a plurality of individual pixel modulators; for example, when a projector comprises a DMD projector, the image modulator comprises a plurality of digital micromirrors, with one micromirror for each pixel of an image to be projected.

As depicted system 100 optionally further comprises one or more 2D ("two-dimensional") warping devices and/or modules 113, for example at the projector 107 (though such a warping device can be present at content player and/or as a stand-alone device) When present, projection data 112 can be warped by the warping module 113, for example by moving and/or adjusting pixels within the projection data 112, to adjust the projection data 112 for projection by the projector 107 onto an object including, but not limited to, a screen, an object and the like. However, as the alignment system 105 determines the pose data 109p and communicates such to the rendering device 101 (and/or device 108), the warping module 113 can be unused, optional and/or eliminated from system 100. Indeed, use of the warping module 113 represents how images were processed according to the prior art and the presence of the warping module 113 is obviated by virtue of the alignment system 105 providing the rendering device 101 (and/or device 108) with the pose data 109p. However, in some implementations, the warping module 113 can be used to make small changes to projection of images onto a physical object, for example when a virtual model of the object used to produce the images does not precisely match the physical object.

While each of the rendering device 101, the content player 103, the alignment system 105, and the projector 107 are depicted as distinct components, in other implementations, respective portions of one or more of the rendering device 101, the content player 103, the alignment system 105, and the projector 107 and can be implemented within the same device (e.g. device 108) and/or processing resources can be shared there between including, but not limited to, in a cloud computing arrangement. For example, while not depicted, system 100 comprises one or more controllers, one or more processors, one or more memories and one or more communication interfaces, for example a controller, memory and communication interface for each of the rendering device 101, the content player 103, the alignment system 105, and the projector 107 and/or to be shared among the rendering device 101, the content player 103, the alignment system 105, and the projector 107. Indeed, in general, components of system 100, as depicted, represent different functionality of a projection system where: the pose data 109p of the projector 107 can be automatically determined. In some implementations, system 100 includes components and/or functionality for projection mapping onto three-dimensional objects and/or for updating the pose data 109p when the projector 107 moves, and/or a screen and/or object, onto which images are being projected, moves.

Figure 2:
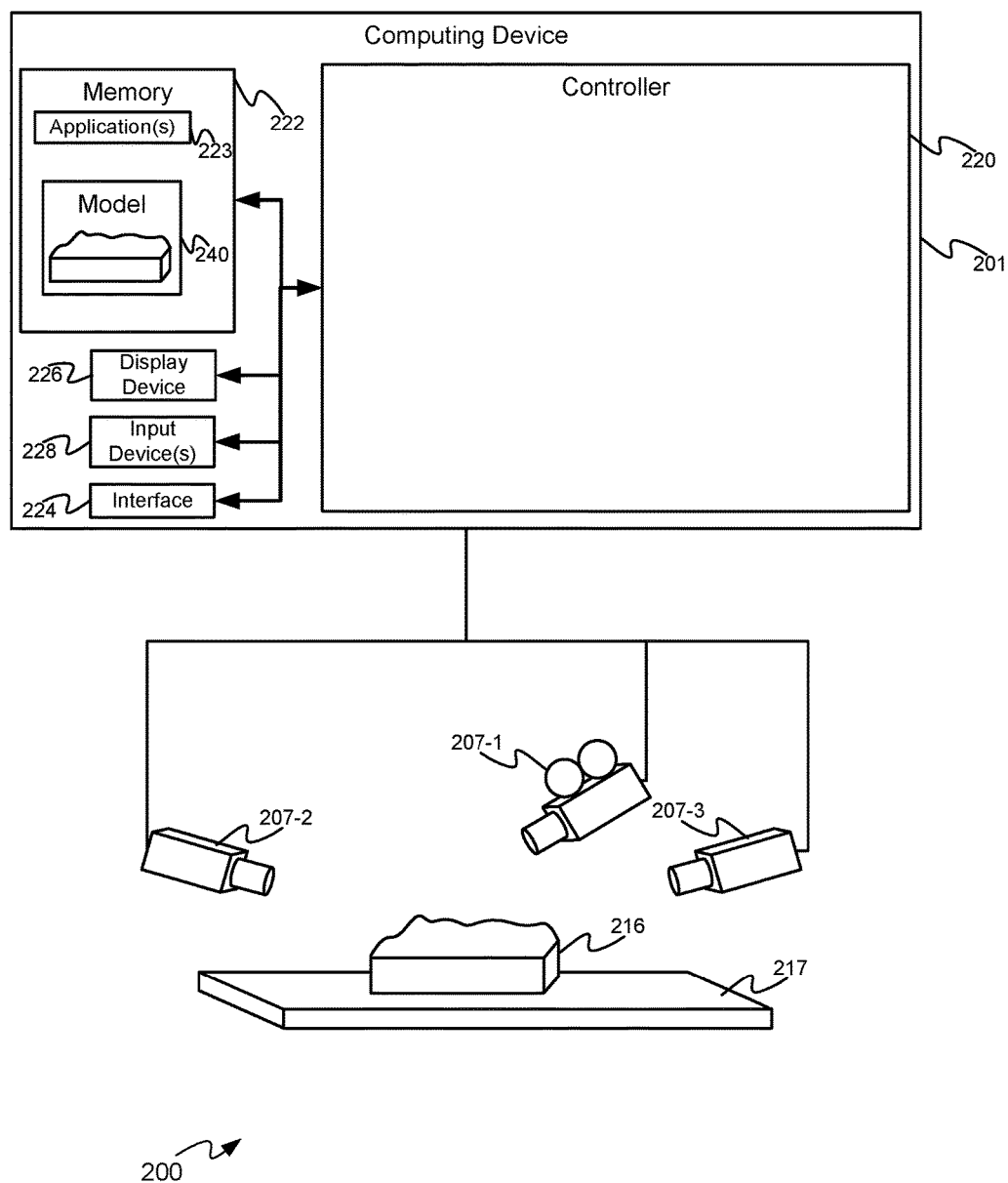
FIG. 2 depicts a system for automatic calibration of image devices, which can be used in the system of FIG. 1, according to non-limiting embodiments.

Attention is next directed to FIG. 2 which depicts a system 200 for automatic calibration of image devices. Indeed, the alignment system 105 can comprise the system 200, and furthermore components of the system 100 can comprise components of the system 200 as desired.

The system 200 comprises a computing device 201, and at least three image devices 207-1, 207-2, 207-3 (interchangeably referred to hereafter, collectively, as image devices 207 and, generically, as an image device 207) that are arranged relative to a physical object 216 that may be placed, for example, on a surface 217. In particular, triplets (e.g. sets of three) of the at least three image devices 217, for which locations and/or poses are to be determined, are in non-collinear arrangements and/or triangular arrangements.

In general, the system 200 and/or the computing device 201 is configured to determine a respective pose of the at least three image devices 207 relative to the physical object 216 such that a projector in the system 200 may accurately projection map onto the physical object 216. As described hereafter, each pose of an image device 207 will be referred to as including a location (e.g. in "x,y,z" coordinates) and an orientation (e.g. a "yaw", a "pitch" and a "roll"), and the system 200 and/or the computing device 201 may be configured to determine a location and/or an orientation for each pose, relative to the physical object 216, depending on a mode of operation of the system 200 and/or the computing device 201. While each pose may further include intrinsic characteristics of an image device 207, such as focal length, lens distortion, and the like, it will be assumed hereafter that such intrinsic characteristics are known, for example as stored and/or preconfigured at a memory of the computing device 201.

The at least three image devices 207 include at least one projector, for example the image device 207-1 configured to project onto a physical object 216, for example in a projection mapping scenario. Others of the at least three image devices 207 may each comprise a respective camera or a respective projector though, as depicted, each of the image devices 207-2, 207-3 each comprise a respective camera.

As described in further detail below, the system 200 and/or the computing device 201 may operate in at least three modes:

A first mode where poses of each of the at least three image devices 207 are unknown (e.g. other than the intrinsic characteristic) and the system 200 and/or the computing device 201 automatically determines the poses relative to the physical object 216.

A second mode where poses of each of the at least three image devices 207 are unknown (e.g. other than the intrinsic characteristic) and the system 200 and/or the computing device 201 determines the poses relative to the physical object based at least in part on input from an input device to initially (e.g. coarsely) align a sensed cloud-of-points representing the physical object 216 and a model of the physical object 216.

A third mode where the locations of each of the at least three image devices 207, relative to the physical object 216, are known (e.g. as are the intrinsic characteristic) but the orientation of the at least three image devices 207 are unknown, and the system 200 and/or the computing device 201 determines the orientations relative to the physical object 216. The third mode may be used: after the locations of each of the at least three image devices 207 are determined, relative to the physical object 216, using the first mode or the second mode (and/or using another technique); and when the orientation of one or more of the image devices 207 changes and their respective relative locations (e.g. relative to the physical object 216) remain within a given range. The given range may depend on the scale of the projection mapping occurring; for example, projection mapping may occur onto very large objects such as building, and movement by a meter or so of one or more of the image devices 207 may not affect the projection mapping, whereas rotation of the image devices 207 may affect such projection mapping, including when a camera is rotated. For example, when a camera used to determine a pose of a projector is rotated, and when the pose of the projector again needs to be determined, rotation of the camera to an unknown orientation will cause the pose of the projector to be incorrectly determined. Hence, the third mode may include, but is not limited to, when an orientation of one or more of the at least three image devices 207 changes and respective locations, relative to the physical object 216, remain within a given range: again determining the respective pose of each of the at least three image devices 207 based on the respective location relative to the model of each of the at least three image devices. The given range may be heuristically determined, and preconfigured at the computing device 201 (e.g. stored in a memory), based on the size of the physical object 216 and/or the scale of the projection mapping.

In some embodiments, the respective poses of each of the at least three image devices 207 are unknown, including the respective location of each of the image devices 207 relative to one another (e.g. the first mode and the second mode). In these embodiments, the system 200 and/or the computing device 201 may be generally configured to determine the respective poses of each of the least three image devices 207 when each pair in a triplet of the at least three image devices 207 have at least partially overlapping fields of view on the physical object 216.

Furthermore, triplets of the at least three image devices 217 are arranged in non-collinear arrangements. For example, each set of three image devices 217 for which the relative poses are to be determined are not arranged in a straight line, but rather form a triangle. Put another way, locations of triplets of the at least three image devices 217 for which poses are to be determined are one or more of: in a respective non-collinear arrangement; and form a triangle.

For example, in these embodiments, when the system 200 comprises three image devices 207 (e.g. as depicted), in a non-collinear and/or triangular arrangement, and the system 200 and/or the computing device 201 is to automatically determine their relative poses relative to the physical object 216, the system 200 is arranged such that fields of view of all three image devices 207 at least partially overlap on the physical object 216. However, when a fourth image device 207 is added to the system 200, the field of view of the fourth image device 207 is assumed to at least partially overlap, on the physical object 216, with the fields of view of at least two of the other three image devices 207. Furthermore, the fourth image device 207 is arranged such that the fourth image device 207 is in a non-collinear and/or triangular arrangement with the at least two of the other three image devices 207 which have overlapping fields of view with the fourth image device 207. The fourth image device 207 may be in a collinear arrangement with other pairs of the image devices 207 but, in these instances, the pose of the fourth image device 207, relative to the pair of image devices 207, with which it is in the arrangement is not determined.

In other words, the field of view of a fourth image device 207 may at least partially overlap, on the physical object 216, with all three of the other three image devices 207, but need overlap with only two of the of the other three image devices 207 with which it is in a non-collinear and/or triangular arrangement. Similar conditions exist when yet further image devices 207 are added to the system 200: a field of view of each further image device 207 is assumed to at least partially overlap, on the physical object 216, with a field of view of two of the other image devices 207 with which it is in a non-collinear and/or triangular arrangement. Put another way, fields of view of triplets of the at least three image devices 207, in a non-collinear and/or triangular arrangement, are assumed to at least partially overlap, on the physical object 216.

In other embodiments (e.g. the third mode), when the locations of three image devices 207 in the system 200 are known (and which are in a non-collinear and/or triangular arrangement), but, for example, the orientations are unknown, when a fourth image device 207 is added to the system 200, a field of view of the fourth image device 207 at least partially overlaps with at least one of the three image devices 207 (e.g. a field of view of the fourth image device 207 may at least partially overlap with only one of the three image devices 207). This mode assumes that the location of all four (or more) image devices 207 relative to the physical object 216 is known. However, in the third mode, the fourth image device may be in a collinear and/or non-triangular arrangement with the other image devices 207.

Each projector of the image devices 207 can comprise one or more of a digital projector, a cinema projector, an LCOS (Liquid Crystal on Silicon) based projector, a DMD (digital micromirror device) based projector and the like. Each camera of the image devices 207 can comprise one or more of a digital camera, a CCD (charge coupled device) and the like.

As depicted, the image device 207-1 comprises a projector, and each of the image devices 207-2, 207-3 comprise a respective camera, however, alternatively, both of the image devices 207-2, 207-3 may comprise a respective projector (e.g. all three image devices 207 may comprise a respective projector) and/or one of the image devices 207-2, 207-3 may comprise a camera while the other of the image devices 207-2, 207-3 may comprise a projector.

As depicted, assuming the first mode and/or the second mode of operation of the system 200, each of the at three image devices 207 are mounted relative to the physical object 216 (as depicted the physical object 216 is on the surface 217) with each pair of the three image devices 207 at least partially overlapping on the physical object 216. For example, fields of view of the image devices 207-1, 207-2 at least partially overlap on the physical object 216, fields of view of the image devices 207-1, 207-3 at least partially overlap on the physical object 216, and fields of view of the image devices 207-2, 207-3 at least partially overlap on the physical object 216. Indeed, pairs of any triplet of the at least three image devices 207 generally have at least partially overlapping fields of view on the physical object 216.

In general, the physical object 216 comprises a physical object having depth relative to each of the image devices 207 and hence may include, but is not limited to: a three-dimensional object, a curved surface, an irregular surface, and the like. Indeed, the physical object 216 can comprise any non-planar object (and/or objects) and/or environment having depth onto which images are to be projected, for example by a projector Alternatively, the physical object 216 may comprise a planar object and at least one non-planar object, a field-of-view of the image devices 217 at least partially overlapping on the at least one non-planar object.

As depicted, the at least three image devices 207 include at least one camera used to determine pixel correspondences between the image devices 207. For example, a projector of the image devices 207 may be controlled to project structured light patterns on to the physical object 216; the at least one camera captures images of the structured light patterns projected onto the physical object 216 and, from the images, pixel correspondences between the camera and the projector may be determined. For example, a projector may be controlled, for example by the computing device 201, to project one image pixel at a time onto the physical object 216 (e.g. using a DMD and the like) and a camera may capture respective images of all the one image pixels using respective pixels of an imager of the at least one camera (e.g. a CCD, and the like). The images from the camera may be provided to the computing device 201 which may determine which pixels of each of the projector and the camera correspond to each other. However, any structured light patterns may be used to determine such pixel correspondences, including, but not limited to, successive patterns of horizontal and vertical stripes, successive patterns of checks and/or boxes, and the like. In this manner, pixel correspondences between a camera and projector having at least partially overlapping fields of view on the physical object 216 may be determined.

However, when a pair of the image devices 207 having at least partially overlapping fields of view on the physical object 216 include two projectors, the physical object 216 may be at least temporarily provided with a grid (and the like) of light sensors (e.g. light sensing diodes, and the like) in communication with the computing device 201, to determine pixel correspondences between the two projectors. For example, each of the two projectors may be controlled to sequentially project one image pixel at a time (e.g. using a respective digital micromirror device and the like) and when a given light sensor detects a respective image pixel from each of the projectors, the respective pixels from each of the projectors (e.g. of respective digital micromirror devices and the like) that were used to produce the respective image pixels may be determined (e.g. by the computing device 201) to correspond. In this manner, pixel correspondences between two projectors having at least partially overlapping fields of view on the physical object 216 may be determined.

In general, the projector 107 can comprise the projector of the image devices 207, the alignment system 105 can comprise computing device 201 the projector and the camera of the image devices 207, and any of the rendering device 101 and the content player 103 can comprise at least a portion of computing device 201, for example when resources are shared amongst the rendering device 101, the content player 103 and the alignment system 105.

Furthermore, while three image devices 207 are depicted, the system 200 may comprise any number of image devices 207, as long as, in the first mode and the second mode of operation: fields of view of triplets of the image devices 207, in a non-collinear and/or triangular arrangement, at least partially overlap. Such a condition may be referred to as a triangular condition: specifically, triplets of the image devices 207 have at least partially overlapping fields of view on the physical object 216. Similarly, while three image devices 207 are depicted, the system 200 may comprise any number of image devices 207, as long as, in the third mode of operation: fields of view of pairs of the image devices 207, in a non-collinear and/or triangular arrangement, at least partially overlap.

While only one projector (e.g. the image device 207-1) and two cameras are depicted (e.g. the image devices 207-2, 207-3), the system 200 can comprise more than one projector and more or fewer than two cameras (e.g. as few as zero cameras, presuming all of the at least image devices 207 are projectors) each aimed at the physical object 216 from a different location and a different orientation. Furthermore, as described above, respective fields of view of the at least three image devices 207 at least partially overlap, however the more overlap therebetween the more accurate the automatic calibration of image devices. In some instances, such overlap may be in a range of greater than about 50% overlap, while in other embodiments, such overlap may be in a range of greater than about 75% overlap. It is further appreciated that that shadows can occur in the fields of view of the image devices 207.

As described above, it is assumed in the first mode and the second mode of operation that the pose of each of the image devices 207 is not initially known (other than the intrinsic characteristics). For example, a pose of each of the image devices 207 may comprise: a location (e.g. an "xyz" location) relative to the physical object 216 and/or an origin which may be arbitrarily located anywhere relative to the physical object 216 and/or the image devices 207 and/or the surface 217; and an orientation (e.g. "yaw", "pitch", "roll" orientation) relative to the physical object 216 and/or the origin.

As will be described in more detail below, the computing device 201 is generally configured to automatically calibrate the image devices 207, for example by determining the pose of the image devices 207 relative to the physical object 216 and/or the origin, including, but not limited to, determining a respective relative location between the image devices 207 using respective relative vectors determined between pairs of the image devices 207 having at least partially overlapping fields of view.

The computing device 201, interchangeably referred to hereafter as the device 201 can comprise any suitable computing device, including but not limited to a graphics processing unit (GPU), a graphics processing device, a graphics processing engine, a video processing device, a personal computer (PC), a server, and the like, and generally comprises a controller 220, a memory 222 storing one or more applications 223, a communication interface 224 (interchangeably referred to hereafter as the interface 224) and optionally any suitable combination of a display device 226 and at last one input device 228.

Each of the one or more applications 223 may be similar, but for a different mode of operation of the system 200 and/or the computing device 201 (e.g. a first application 223 for the first mode of operation, a second application 223 for the second mode of operation, a third application 223 for the third mode of operation, etc.). For simplicity, the one or more applications 223 will be interchangeably referred to hereafter as the application 223. However, the mode of operation of the computing device 201, and hence the corresponding application 223, may be selected using the at least one input device 228 via a menu system and the like, rendered at the display device 226.

While not depicted, the memory 222 may further store the intrinsic characteristics of each of the image devices 207, for example at the application 223, and/or separate from the application 223. Put another way, the computing device 201 and/or the system 200 may be preconfigured with the intrinsic characteristics of each of the image devices 207; for example, the intrinsic characteristics of each of the image devices 207 may be determined manually and/or from factory settings and stored at the memory 222.

As depicted, the memory 222 further stores a model 240 of the physical object 216 including physical dimensions thereof. For example, the model 240 of the physical object 216 may be obtained using laser-scanning techniques, and/or a computer aided drawing (CAD) model of the physical object 216 may be available, for example from the original plans of the physical object 216. Furthermore, the model 240 may be in any suitable format including, but not limited to, a DXF (Drawing Exchange Format) file, a GIS (geographic information system) file, a PCD (Point Cloud Data) file, an OBJ file, a color coordinate file defining color of the physical object), and the like. In general, the model 240 of the physical object 216 is obtained, for example using laser scanning techniques, computer repositories, databases, and the like, and stored at the memory 222.

The controller 220 can comprise a processor and/or a plurality of processors, including but not limited to one or more central processors (CPUs) and/or one or more processing units; either way, the controller 220 comprises a hardware element and/or a hardware processor. Indeed, in some implementations, the controller 220 can comprise an ASIC (application-specific integrated circuit) and/or an FPGA (field-programmable gate array) specifically configured for automatic calibration of image devices. Hence, the device 201 may preferably not be a generic computing device, but a device specifically configured to implement specific functionality for automatic calibration of image devices. For example, the device 201 and/or the controller 220 can specifically comprise a computer executable engine configured to implement specific functionality for automatic calibration of image devices.

The memory 222 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the device 201 as described herein are typically maintained, persistently, in the memory 222 and used by the controller 220 which makes appropriate utilization of volatile storage during the execution of such programming instructions. Those skilled in the art recognize that the memory 222 is an example of computer readable media that can store programming instructions executable on the controller 220. Furthermore, the memory 222 is also an example of a memory unit and/or memory module and/or a non-volatile memory.

In particular, the memory 222 stores an application 223 that, when processed by the controller 220, enables the controller 220 and/or computing device 201 to (e.g. in the first mode of operation and the second mode of operation): determine respective pixel correspondences between the pairs of the at least three image devices 207 as a projector (of the image devices 207) is projecting structured light onto the physical object 216; determine a respective relative vector between a first pair of the at least three image devices 207 using the respective pixel correspondences therebetween; determine respective relative vectors between further image devices 207, of the at least three image devices 207, and any two of the at least three image devices 207 that share pixel correspondences with the further image devices 207 and for which the respective relative vector has already been determined, until the respective relative vectors between all of the at least three image devices 207 are determined; determine a respective relative location between each of the at least three image devices 207 based on the respective relative vectors between the at least three image devices 207, setting a relative distance between one pair of the at least three image devices 207 to an arbitrary distance, the respective relative location of each of the at least three image devices 207 being further relative to a sensed cloud-of-points representing the physical object 216; align the model 240 and the sensed cloud-of-points to transform the respective relative location of each of the at least three image devices to a respective location relative to the model 240; and cause controlling of the projector to project onto the physical object 216 based at least on the respective location relative to the model 240 of each of the at least three image devices 207.

The interface 224 comprises any suitable wired or wireless communication interface configured to communicate with the image devices 207 (and any of the rendering device 101, the content player 103, the alignment system 105, and device 108) in a wired and/or wireless manner as desired including, but not limited using cables, WiFi communication links, Bluetooth™ communication links, personal area networks, local area networks, and the like.

The display device 226, may comprise any suitable one of, or combination of, flat panel displays (e.g. LCD (liquid crystal display), plasma displays, OLED (organic light emitting diode) displays, capacitive or resistive touchscreens, CRTs (cathode ray tubes) and the like). The at least one input device 228 may comprise any suitable combination of input devices, including but not limited to a keyboard, a keypad, a pointing device, a mouse, a track wheel, a trackball, a touchpad, a touch screen (e.g. integrated with display device 226), and the like. The at least one input device 228 will be interchangeably referred to hereafter as the input device 228. Other suitable display devices and/or input devices are within the scope of the present specification.

Figure 3:
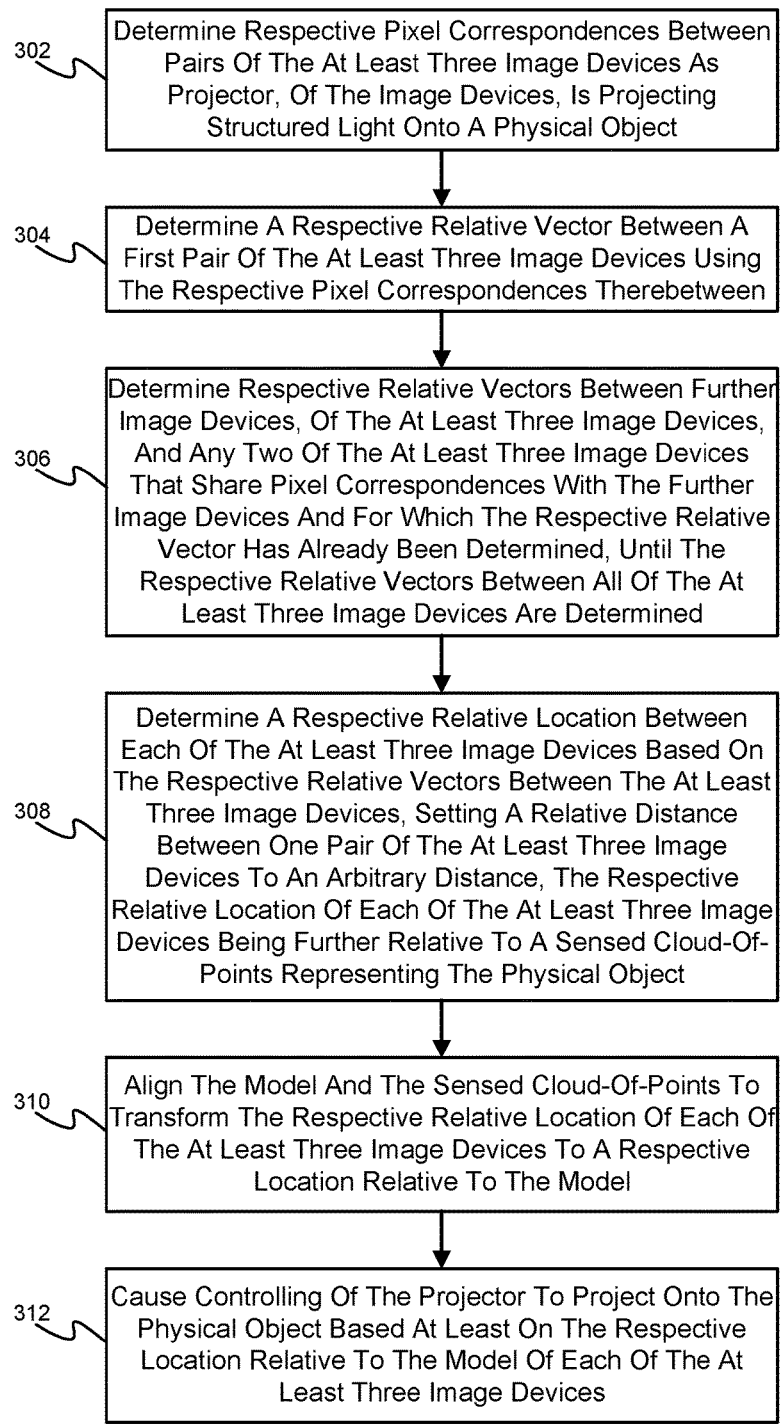
FIG. 3 depicts a method for automatic calibration of image devices, according to non-limiting embodiments.

Attention is now directed to FIG. 3 which depicts a flowchart of a method 300 for automatic calibration of image devices, according to non-limiting embodiments. In order to assist in the explanation of the method 300, it will be assumed that the method 300 is performed using the system 200, and specifically by the controller 220 of the device 201, for example when the controller 220 processes application 223. Indeed, the method 300 is one way in which the system 200 and/or the device 201 can be configured. Furthermore, the following discussion of the method 300 will lead to a further understanding of the device 201, and the system 200 and its various components. However, it is to be understood that the system 200 and/or the device 201 and/or the method 300 can be varied, and need not work exactly as discussed herein in conjunction with each other, and that such variations are within the scope of present embodiments.

Regardless, it is to be emphasized, that the method 300 need not be performed in the exact sequence as shown, unless otherwise indicated; and likewise, various blocks may be performed in parallel rather than in sequence; hence the elements of the method 300 are referred to herein as "blocks" rather than "steps". It is also to be understood, however, that the method 300 can be implemented on variations of the system 200 as well. Furthermore, while computing device 201 is described as implementing and/or performing each block of the method 300, it is appreciated that each block of the method 300 occurs using the controller 220 processing application 223.

It is further appreciated by persons of skill in the art that the method 300 represents the first mode of operation and the second mode of operation of the system 200 and/or the computing device 201.

At a block 302, the controller 220 determines respective pixel correspondences between the pairs of the at least three image devices 207 as the projector (of the image devices 207) is projecting structured light onto the physical object 216. As previously described, such a determination may occur between a camera and a projector having at least partially overlapping fields of view by way of camera pixels detecting image pixels projected by the projector in the structured light patterns. As also previously described, such a determination may occur between two projectors having at least partially overlapping fields of view by way of light sensors at least temporarily mounted at the physical object 216 detecting image pixels projected by each of the projectors in structured light patterns projected by each of the projectors.

At a block 304, the controller 220 determines a respective relative vector between a first pair of the at least three image devices 207 using the respective pixel correspondences therebetween. The first pair of at least three image devices 207 may be selected in any suitable manner, including, but not limited to, the pair of at least three image devices 207 having the highest number and/or highest percentage of pixel correspondences therebetween and/or using other criteria. Hence, in some embodiments, the controller 220 is configured to select the first pair of the at least three image devices 207 based on numbers of pixel correspondences between the at least three image devices.

Such a determination may generally include determination of a relative pose of each image device 207 in the first pair, including, for example the relative arbitrary location and the relative orientation of each image device 207 of the first pair in an image device space with one of the image devices 207 of the first pair at an origin in an "image device" space (e.g. a space that is relative to one of the image devices 207 and not the physical object 216). Furthermore, such an origin may be automatically set to a location of one of the first pair of the image devices 207, or another location relative to one of the first pair of the image devices 207.

In some embodiments, the respective pixel correspondences may be used to construct a Fundamental Matrix, an Essential Matrix and the like, from which a relative pose of each of image device 207, of the first pair of the image devices 207, is derived. The relative vector between of the first pair of the image devices 207 may be derived from their relative poses.

Use of a Fundamental Matrix to derive relative poses using pixel correspondences of image devices is describe in "Multiple View Geometry in Computer Vision" by Richard Hartley and Andrew Zisserman, Cambridge University Press, Copyright 2003. An Essential Matrix is a similar mathematical construct as a Fundamental Matrix. While, hereafter, example embodiments are described with respect to constructing Fundamental Matrices, any function where pixel correspondences between pairs of the image devices are used as input, and from which respective relative poses and/or a respective relative vector are derived, is within the scope of the present specification. However, such techniques generally do not result in determination of a relative distance between image devices; for example, when constructing a Fundamental Matrix using pixel correspondences between a pair of image devices, a difference in arbitrary location of each image device determined from each respective pose may generally yield a 3-dimensional vector providing a general direction therebetween, for example relative to their respective orientations, but the distance therebetween is generally arbitrary.

Put another way, the respective poses of a first image device and a second image device derived using a Fundamental Matrix, as described in detail below, includes an arbitrary location of the second image device, presuming the first image device is at an origin. Similarly, the respective poses of a third image device and the first image device derived using another Fundamental Matrix, as described in detail below, includes another arbitrary location of the third image device, presuming the first image device is at an origin. In other words, the poses of each of the first image device, the second image device and the third image device may include relative orientations, but using the Fundamental Matrix technique (and/or the Essential Matrix technique, and the like), the relative distances between all three of the image devices is not determined.

Hence, the controller 220 may be configured to one or more of: use the respective pixel correspondences between the pairs of the at least three image devices 207 to construct one or more of respective Fundamental Matrices and respective Essential Matrices therebetween, the respective relative vectors being derived from one or more of the respective Fundamental Matrices and the respective Essential Matrices; and use the respective pixel correspondences between the pairs of the at least three image devices 207 as input to a function from which the respective relative vectors are derived. Whether Fundamental Matrices, Essential Matrices and/or another function are used, the respective relative vectors between two image devices 207 may be derived from respective relative poses of each of the image devices 207.

In particular, using pixel correspondences between a first pair of the image devices 207 having at least partially overlapping fields of view, a vector (e.g. an angle and a corresponding direction relative to, for example, one image device 207 of the first pair of image devices 207) therebetween may be determined by setting a relative location of a first image device 207 in the first pair to the origin, and determining the relative location of the second image device 207 in the first pair, the vector of the second image device 207 being defined by its location relative to the origin. In particular, the relative poses of a pair of the image device 207, as derived from a Fundamental Matrix, and the like, includes respective relative locations, however such respective relative locations are generally in arbitrary units, and furthermore may be determined relative to the arbitrary origin (e.g. a location of one of the first pair of the image devices 207 as described above).

For example, a location of a first image device 207-1 of a pair (e.g. the image devices 207-1, 207-2) may be determined as in an (xyz) coordinate system, and arbitrarily used as the origin, e.g. in image device space of the pair of image devices 207-1, 207-2. In other words, the location of the first image device 207-1 is set to the origin and hence in these embodiments, the image device space of the pair of image devices 207-1, 207-2 is referred to hereafter as a first image device space. A location of a second image device 207-2 may be determined to be relative to the origin in the first image device space; hence, the position of the second image device 207-2 is generally relative to the location of the first image device 207-1 in the first image device space.

As described above, the relative locations of the image devices 207-1, 207-2, derived from the Fundamental Matrix, in the first image device space are in arbitrary units such that the absolute value of therebetween may be set to any value, for example a value of 1 arbitrary unit. However, the location of the second image device 207-2 in the first image device space, relative to the first image device 207-1 at the origin, provides a general 3-dimensional vector of the second image device 207 relative to the first image device 207 in the first image device space. The poses derived from the Fundamental Matrix further yield the orientation of each of the image devices 207-1, 207-2, relative to each other, and hence the direction of the vector may further be defined with respect to the poses, and/or vice versa.

At a block 306, the controller 220 determines respective relative vectors between further image devices 207, of the at least three image devices 207, and any two of the at least three image devices 207 that share pixel correspondences with the further image devices 207 and for which the respective relative vector has already been determined, until the respective relative vectors between all of the at least three image devices 207 are determined, for example in a common image device space, such as the first image device space. It is further understood by a person of skill in the art that the further image devices 207, of the at least three image devices 207, and any two of the at least three image devices 207 that share pixel correspondences with the further image devices 207 are in a non-collinear and/or triangular arrangement, as described above. Such a determination occurs by determining angles between the respective relative vectors of a triplet of image devices 207; for example, when the angles are all "0" degrees or "180" degrees, the controller 220 may discard the triplet as the triangular condition is not met.

For example, the controller 220 may, at the block 304, first determine a relative vector between the image devices 207-1, 207-2 as described above using, for example, a location of the image device 207-1 as an origin in the first image device space, which also results in determination of their relative poses, as well as their relative orientations.

At the block 306, the controller 220 may construct a Fundamental Matrix using respective pixel correspondences between a second pair of the image devices 207, such as the image devices 207-1, 207-3. The second pair of image devices 207 may be selected based on the pair of image devices 207 having the second largest number of pixel correspondences and/or other criteria.

For example, using respective pixel correspondences between the image devices 207-1, 207-3 to derive a Fundamental Matrix and respective relative poses, the relative vector, as well as relative poses, therebetween may be determined in the first image device space that includes the image devices 207-1, 207-3, with the image device 207-1 at the origin (i.e. the image device space that includes the image devices 207-1, 207-2, with the image device 207-1 at the origin, is the image device space that includes the image devices 207-1, 207-3, with the image device 207-1 at the origin; in other words, the respective relative poses of each of the image devices 207-2, 207-3 are determined relative to the pose of the image device 207-1).

However, the distance between the image devices 207-1, 207-3 remains in arbitrary units and hence the relative distance between the image devices 207-1, 207-2, 207-3 in the first image device space has not yet between determined. However, the relative vector between the image devices 207-1, 207-2 and the relative vector between the image devices 207-1, 207-3 has been determined in the first image space. Yet to be determined is the relative vector between the image devices 207-2, 207-3 in the first image device space.

Hence, using respective pixel correspondences between the image devices 207-2, 207-3 to derive a Fundamental Matrix and respective relative poses, the relative vector therebetween may be determined in a second image device space that includes the image devices 207-2, 207-3, with, for example, the image device 207-2 at the origin. However, the distance therebetween is again determined in arbitrary units.

However, the second image device space may be transformed to the first image device space determined at the block 304 by determining a transform which aligns the relative pose (e.g. the relative location and orientation) of the second image device 207-2 in the second image device space with the relative pose (e.g. the relative location and orientation) of the second image device 207-2 in the first image device space. This same transform is used to transform the relative vector between the image devices 207-2, 207-3 into the first image device space.

Alternatively, the second image device space may be transformed to the first image device space determined at the block 304 by determining a transform which aligns the relative pose (e.g. the relative location and orientation) of the third image device 207-3 in the second image device space with the relative pose (e.g. the relative location and orientation) of the third image device 207-3 in the first image device space. This same transform is used to transform the relative vector between the image devices 207-2, 207-3 into the first image device space.

Either way, the distance between the image devices 207-2, 207-3 is again in arbitrary units and the relative distance between the image devices 207-1, 207-2, 207-3 in the first image device has not yet between determined. However, the relative vector between the image devices 207-1, 207-2, the relative vector between the image devices 207-1, 207-3, and the relative vector between the image devices 207-2, 207-3 have all been determined in the first image device space.

It is, however, understood by persons of skill in the art, that the relative vectors between the pairs of image devices 207-1, 207-2, 207-3 may be determined in any image device space common to all of the image devices 207-1, 207-2, 207-3.

Hence, at a block 308, the controller 220 determines a respective relative location between each of the at least three image devices 207, for example, in a common image device space, such as the first image device space, based on the respective relative vectors between the at least three image devices 207, setting a relative distance between one pair of the at least three image devices 207 to an arbitrary given distance, the respective relative location of each of the at least three image devices 207 being further relative to a sensed cloud-of-points representing the physical object 216.

For example, using the vectors determined between each of the pairs of image devices 207 in the image device space, and by setting a distance between one pair of the image devices 207 to an arbitrary value, such as "1" arbitrary unit, the relative distances between each pair of the image devices 207 may be determined using geometric triangular relationships, such as the Law of Sines. Put another way, the three image devices 207 having overlapping fields of view form a triangle, the vectors therebetween yield the angles of the triangle and assuming a distance of "1" arbitrary unit between one pair of the image devices 207, the other relative locations may be determined using, for example, the Law of Sines.

Furthermore, in some embodiments, at the block 306 and/or the block 308, the controller 220 may refine one or more of the respective relative vector and the respective relative location of each of the at least three image devices 207 using Bundle Adjustment and/or another suitable technique.

In addition, the controller 220 determines a sensed cloud-of-points, representing the physical object 216, in the image device space, which may also be determined at the block 308. For example, each correspondence, of a pixel correspondence, is determined by detecting a projected pixel on the physical object 216; once the relative poses are known, by triangulating the location of each of two pixels (e.g. one from each of two image devices 207), in a pixel correspondence, a corresponding relative location of a sensed image pixel at the physical object 216 may be determined in the image device space. A set of corresponding relative locations of sensed image pixels at the physical object 216 hence represents the physical object 216 and/or at least a portion of the physical object 216 in an image device space, such as the first image device space; the set of corresponding relative locations of sensed image pixels at the physical object 216 hence comprises a sensed cloud-of-points representing the physical object 216 in image device space. When the sensed cloud-of-points is determined in another image device space, the sensed cloud-of-points may be transformed to the first image device space, and/or whichever common image device space in which the relative vectors between the image devices 207 have all been determined.

At the block 310, the controller 220 aligns the model 240 and the sensed cloud-of-points to transform the respective relative location of each of the at least three image devices to a respective location relative to the model 240. For example, the model 240 and the sensed cloud-of-points may be aligned using one or more of automated feature detection and model recognition, and the like, for example to match and/or align features and/or surfaces of the model 240 and the sensed cloud-of-points, each of which represent the physical object 216.

Furthermore, the alignment of the block 310 may be performed automatically (e.g. in the first mode of operation) wherein the controller 220 uses one or more feature detection and/or model recognition algorithms, and the like, (e.g. which may be provided as components of the application 223) to align the model 240 and the sensed cloud-of-points without manual intervention. However, other algorithms for aligning the model 240 and the sensed cloud-of-points are within the scope of the present specification.

However, the alignment of the block 310 may be performed least partially manually (e.g. in the second mode of operation) wherein the controller 220 may be configured to align the model 240 and the sensed cloud-of-points by: receiving, from the input device 228, an indication of an initial alignment between the model 240 and the sensed cloud-of-points; and automatically complete aligning the model 240 and the sensed cloud-of-points from the initial alignment. For example, a user may control the computing device 201, using the input device 228, to render both the model 240 and the sensed cloud-of-points at the display device 226. The input device 228 may be used to manipulate the model 240 and/or the sensed cloud-of-points until they at least partially align. The controller 220 may then automatically complete the alignment using one or more feature detection and/or model recognition algorithms, and the like.

Regardless, the alignment of the model 240 and the sensed cloud-of-points, includes, but is not limited to, one or more of: changing a scale of the sensed cloud-of-points to match the scale of model 240 (which includes physical dimensions of the physical object 216), rotating one or more of the model 240 and the sensed cloud-of-points relative each other, and translation of one or more of the model 240 and the sensed cloud-of-points relative each other (e.g. in a x-direction, a y-direction and/or a z-direction).

The alignment hence results in a transform of the sensed cloud-of-points to match the model 240. The same transform may be applied to the relative poses of the image devices 207, including the respective relative locations determined at the block 308, to determine the respective poses of the image devices 207 relative to the model 240 and hence the physical object 216. The transform is also applied, for example, to the relative orientations of the image devices 207, determined using Fundamental Matrices, and the like.

At a block 312, the controller 220 causes controlling of the projector (e.g. the image device 207-1 and/or the projector 107) to project onto the physical object 216 based at least on the respective location relative to the model 240 of each of the at least three image devices 207. The controlling of the projector may occur directly using the controller 220 and/or the controlling of the projector may occur by way of the controller 220 providing the respective poses, including the respective poses, relative to the model 240 to the rendering device 101 and/or the device 108, as the pose data 109p. The pose data 109p of at least the projector of the image devices 207 (e.g. the image device 207-1) may be used to generate the projection data 112, assuming the projector of the image devices 207 comprises the projector 107.

It is understood by persons of skill in the art that while the method 300 is described with respect to three image devices 207, the blocks 306 to 308 may be implemented for numbers of image devices 207 greater than three. For example, the controller 220 is generally configured to: repeat determining the respective pixel correspondences (e.g. at the block 302), the respective relative vectors (e.g. at the blocks 304, 306) and the respective relative locations (e.g. at the block 308) for a number of image devices 207 greater than three.

It is further understood by persons of skill in the art, that while the method 300 is described with respect to determining respective vectors between the at least three image devices 207 and respective relative locations therebetween, the controller 220 is further configured to: when determining the respective relative vectors, determine, using the respective pixel correspondences, a respective relative pose of each of the at least three image devices 207, the respective relative pose including the respective relative vectors; when aligning the model 240 and the sensed cloud-of-points, transform the respective relative pose of each of the at least three image devices 207 to a respective pose relative to the model 240 (e.g. and hence the physical object 216); and cause controlling of the projector (e.g. of the image devices 207) to project onto the physical object 216 based on the respective location and the respective pose relative to the model 240 of each of the at least three image devices 207.

Example embodiments of the method 300 are next described with respect to FIG. 4 to FIG. 9, with each of FIG. 4 to FIG. 9 being substantially similar to FIG. 2 with like elements having like numbers. It is further assumed in FIG. 4 to FIG. 9 that the controller 220 is implementing the application 223.

Figure 4:
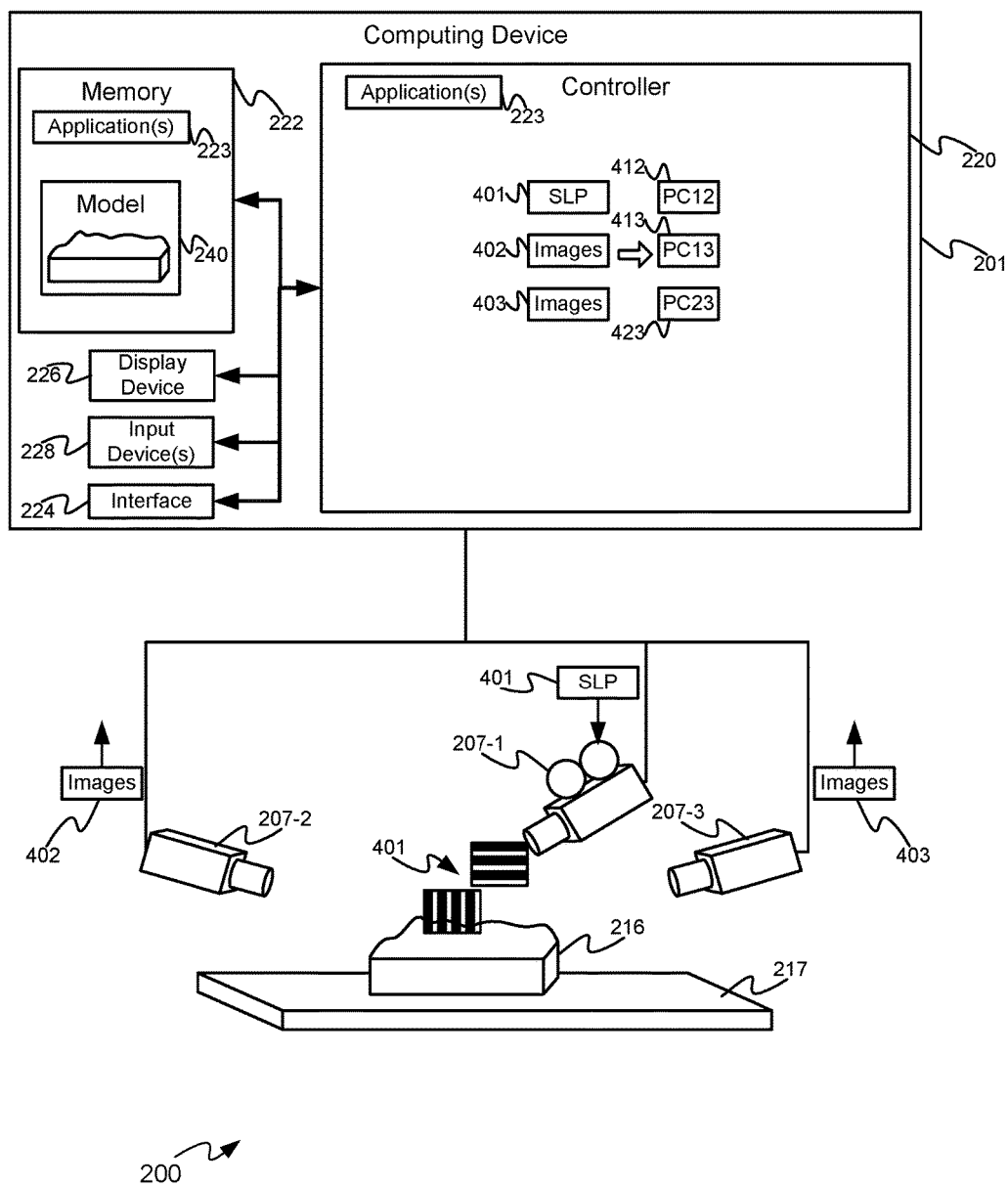
FIG. 4 depicts the system of FIG. 2 determining pixel correspondences between image devices, according to non-limiting embodiments.

Attention is next directed to FIG. 4 which depicts an example embodiment of the block 302 of the method 300. In particular, the controller 220 is controlling the projector of the image devices 207 (e.g. the image device 207-1) to project structured light patterns 401 (e.g. a series of horizontal and vertical stripes, for example of increasingly finer resolution) onto the physical object 216. As the projector is projecting the structured light patterns onto the physical object 216, the cameras of the image devices 207 (e.g. the image devices 207-2, 207-3) are acquiring respective images 402, 403 of the structured light patterns 401. The controller 220 receives the images 402, 403 from the cameras, and coordinates the images 402, 403 with the pixels of the structured light patterns 401 to determine respective pixel correspondences 412, 413, 423 between respectively, the image devices 207-1, 207-2, the image devices 207-1, 207-3, and the image devices 207-2, 207-3. In other words, the pixel correspondences 412 are between the image devices 207-1, 207-2, the pixel correspondences 413 are between the image devices 207-1, 207-3, and the pixel correspondences 423 are between the image devices 207-2, 207-3.

Figure 5:
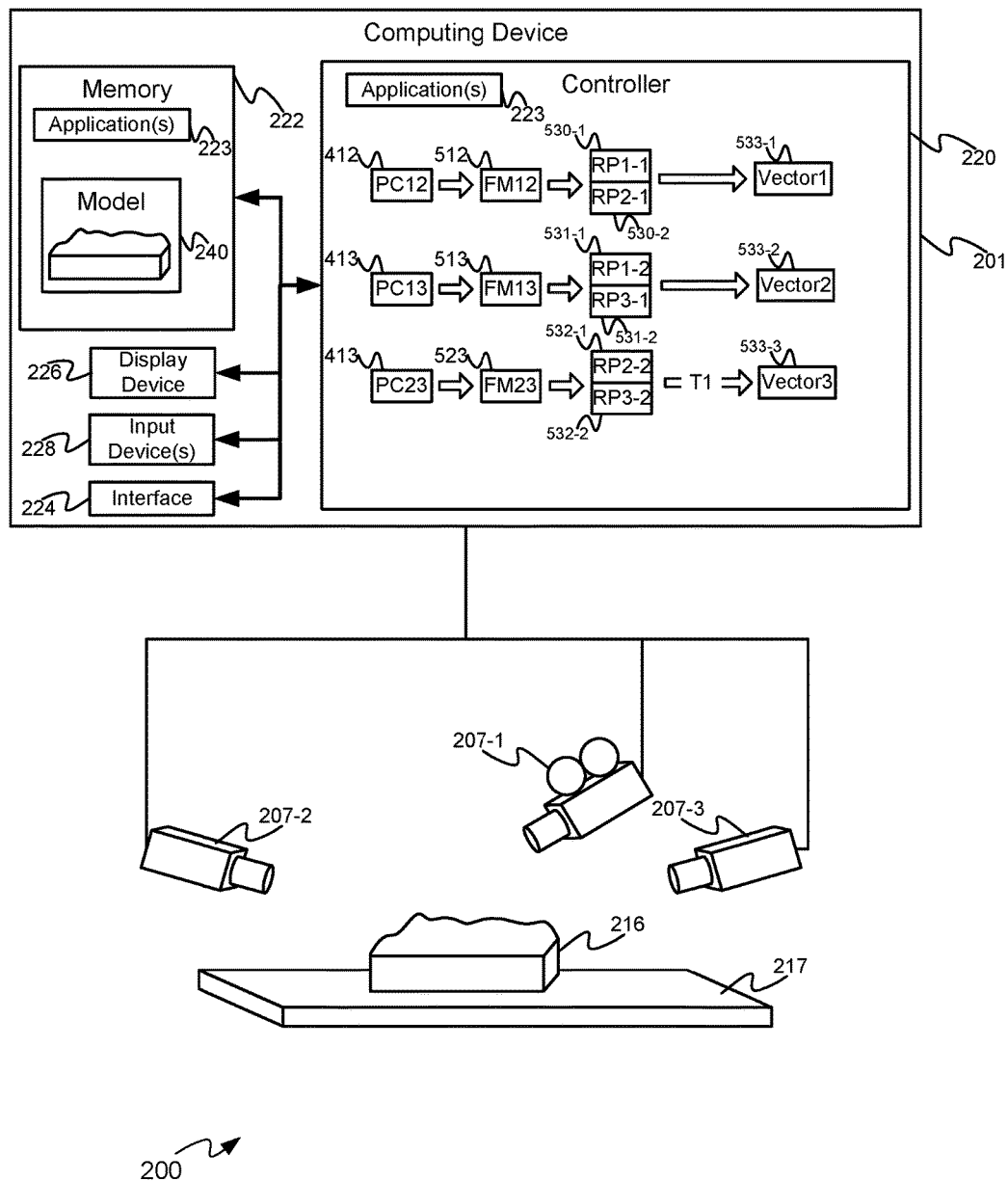
FIG. 5 depicts the system of FIG. 2 determining vectors between image devices based on the pixel correspondences, according to non-limiting embodiments.

Attention is next directed to FIG. 5 which depicts an example embodiment of the block 304 and the block 306 of the method 300. In particular, the controller 220 is using the pixel correspondences 412 between the image devices 207-1, 207-2 to construct a Fundamental Matrix 512 therebetween. Similarly, the controller 220 is using the pixel correspondences 413 between the image devices 207-1, 207-3 to construct a Fundamental Matrix 513 therebetween. Similarly, the controller 220 is using the pixel correspondence 423 between the image devices 207-2, 207-3 to construct a Fundamental Matrix 523 therebetween. The controller 220 may select (e.g. at the block 304) any of the pairs of the at least three image devices 207 as the first pair of the at least three image devices 207 for example based on the numbers of pixels correspondences between the at least three image devices 207 and/or other criteria. In the example embodiments, the image devices 207-1, 207-2 are selected as the first pair of the image devices 207.

From each of the Fundamental Matrices 512, 513, 523, respective relative poses of each of the image devices 207 may be derived, relative to each other in image device space.

For example, a respective relative pose 530-1 (labelled "RP1-1" in FIG. 5) of the image device 207-1 and a respective relative pose 530-2 (labelled "RP2-1 in FIG. 5) of the image device 207-2 is derived from the Fundamental Matrix 512. In some embodiments, the controller 220 sets the respective relative pose 530-1 as an origin in a first image device space, with the respective relative pose 530-2 being relative to the origin in the first image device space.

Similarly, a respective relative pose 531-1 (labelled "RP1-2" in FIG. 5) of the image device 207-1 and a respective relative pose 531-2 (labelled "RP3-1 in FIG. 5) of the image device 207-3 is derived from the Fundamental Matrix 513. In some embodiments, the controller 220 again sets the respective relative pose 531-1 as an origin in the first image device space, with the respective relative pose 531-2 being relative to the origin in the first image device space.

Similarly, a respective relative pose 532-1 (labelled "RP2-2" in FIG. 5) of the image device 207-2 and a respective relative pose 532-2 (labelled "RP3-2 in FIG. 5) of the image device 207-3 is derived from the Fundamental Matrix 523. In some embodiments, the controller 220 sets the respective relative pose 532-1 as an origin in a second image device space, with the respective relative pose 532-2 being relative to the origin in the second image device space.

Furthermore, as described above, the controller 220 may determine the relative vector 533-1 between the image devices 207-1, 207-2 in the first image device space, and further determine the relative vector 533-2 between the image devices 207-1, 207-3 in the first image device space.

The controller 220 may further determine the relative vector (not depicted) between the image devices 207-2, 207-3 in the second image device space and transform the relative vector between the image devices 207-2, 207-3 in the second image device space to a relative vector in the first image device space, for example using a transform T1. The transform T1 also transforms the poses 532-1, 532-2 of the image devices 207-2, 207-3 in the second image device space to the first image device space. The transform T1 may be determined from the Fundamental Matrices 512, 523, and/or the Fundamental Matrices 513, 523, and/or by "aligning" the pose 532-2 with the pose 531-2 of the third image device 207-3, and/or by "aligning" the pose 532-1 with the pose 530-2 of the second image device 207-2. The relative vector between the image devices 207-2, 207-3 in the second image device space may then be transformed to a relative vector 533-3 the first image device space using the transform T1. For example, as depicted the relative vector in the second image device space, determined from the poses 532-1, 532-2, is transformed to the relative vector 533-3 the first image device space by applying the transform T1.

Figure 6:
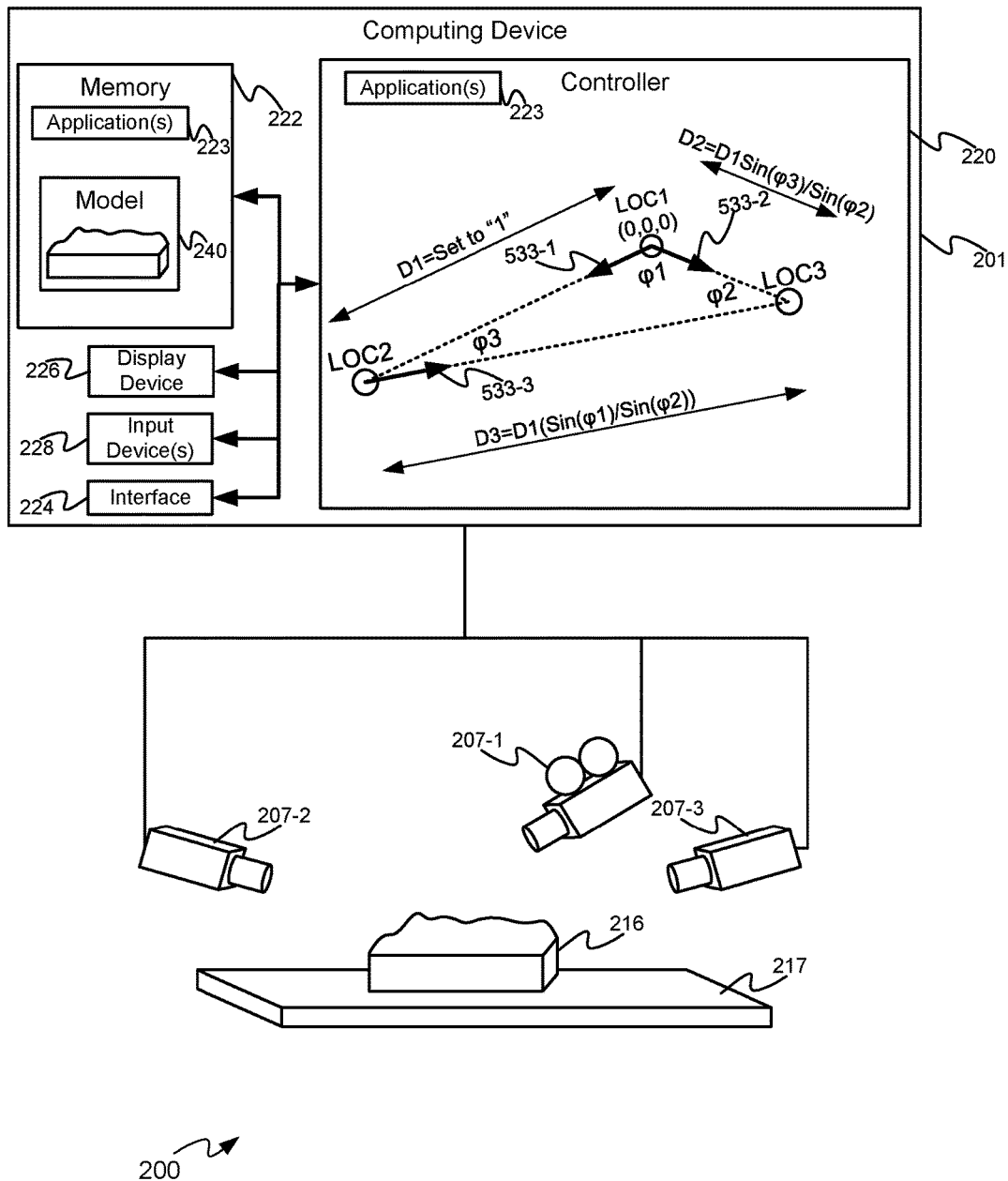
FIG. 6 depicts the system of FIG. 2 determining relative locations between image devices based on the vectors, according to non-limiting embodiments.

Attention is next directed to FIG. 6 which depicts an example embodiment of the block 308 of the method 300. The vectors 533-1, 533-2, 533-3 (interchangeably referred to hereafter, collectively, as the vectors 533 and, generically as a vector 533) are depicted graphically at the controller 220, relative to the origin of the first image device space. While the vectors 533 are depicted two-dimensionally as being in a plane in the page of FIG. 6, it is understood by persons skilled in the art that the vectors 533 are three dimensional, and may have a respective direction in an xyz coordinate system of the first image device space of the first image device 207-1 (or another common image device space), using, for example, the location of the image device 207-1 as the origin. The location of the image device 207-1 in the first image device space is labelled as LOC1 in FIG. 6 and set to be the origin (0,0,0) in the first image device space. Similarly, the location of the image device 207-2 in image device space is labelled as LOC2 in FIG. 6, and the location of the image device 207-3 in image device space is labelled as LOC3 in FIG. 6. However, it is appreciated that the locations of each of the image devices 207, relative to each other, and/or in the first image device space, are not initially known.

To determine the locations of each of the image devices 207, relative to each other, and/or in the first image device space, a triangle may be constructed from the vectors 533, the triangle having angles $\varphi 1$, $\varphi 2$, $\varphi 3$, each defined by the direction of respective pairs of the vectors 533 in the first image device space. A respective image device 207 is assumed to be located at each vertex of the triangle defined by the respective pairs of the vectors 533. Hence, for example, as the vectors 533-1, 533-2 are each associated with the image device 207-1, the image device 207-1 is assumed to be located at the vertex formed by the vectors 533-1, 533-2, and the angle therebetween is the angle $\varphi 1$; similarly, as the vectors 533-2, 533-3 are each associated with the image device 207-2, the image device 207-2 is assumed to be located at the vertex formed by the vectors 533-2, 533-3, and the angle therebetween is the angle $\varphi 2$; and similarly, as the vectors 533-1, 533-3 are each associated with the image device 207-3, the image device 207-3 is assumed to be located at the vertex formed by the vectors 533-1, 533-3, and the angle therebetween is the angle $\varphi 3$.

The controller 220 sets a distance D1 between two of the image devices 207-1, 207-2 (e.g. the first pair) to an arbitrary value, for example, as depicted, "1". Using geometric relationships such as the Law of Sines, a relative distance D2 between the image devices 207-1, 207-3 may be determined with respect to D1 and the angles $\varphi 1$, $\varphi 2$, $\varphi 3$ (e.g. as depicted, $D2=D1(Sin(\varphi 3)/Sin(\varphi 2))$, though D2 may be expressed with respect to other combinations and/or functions of the angles $\varphi 1$, $\varphi 2$, $\varphi^3$). Similarly, a relative distance D3 between the image devices 207-2, 207-3 may be determined with respect to D1 and the angles $\varphi 1$, $\varphi 2$, $\varphi 3$ (e.g. as depicted, $D3=D1(Sin((\varphi 1)/Sin((\varphi 2))$, though D3 may be expressed with respect to other combinations and/or functions of the angles $\varphi 1$, $\varphi 2$, $\varphi 3$).

Hence, the relative locations LOC1, LOC2, LOC3 of each of the at least three image devices 207 in the first image device space is determined based on the respective relative vectors 533-1, 533-2, 533-3.

Figure 7:
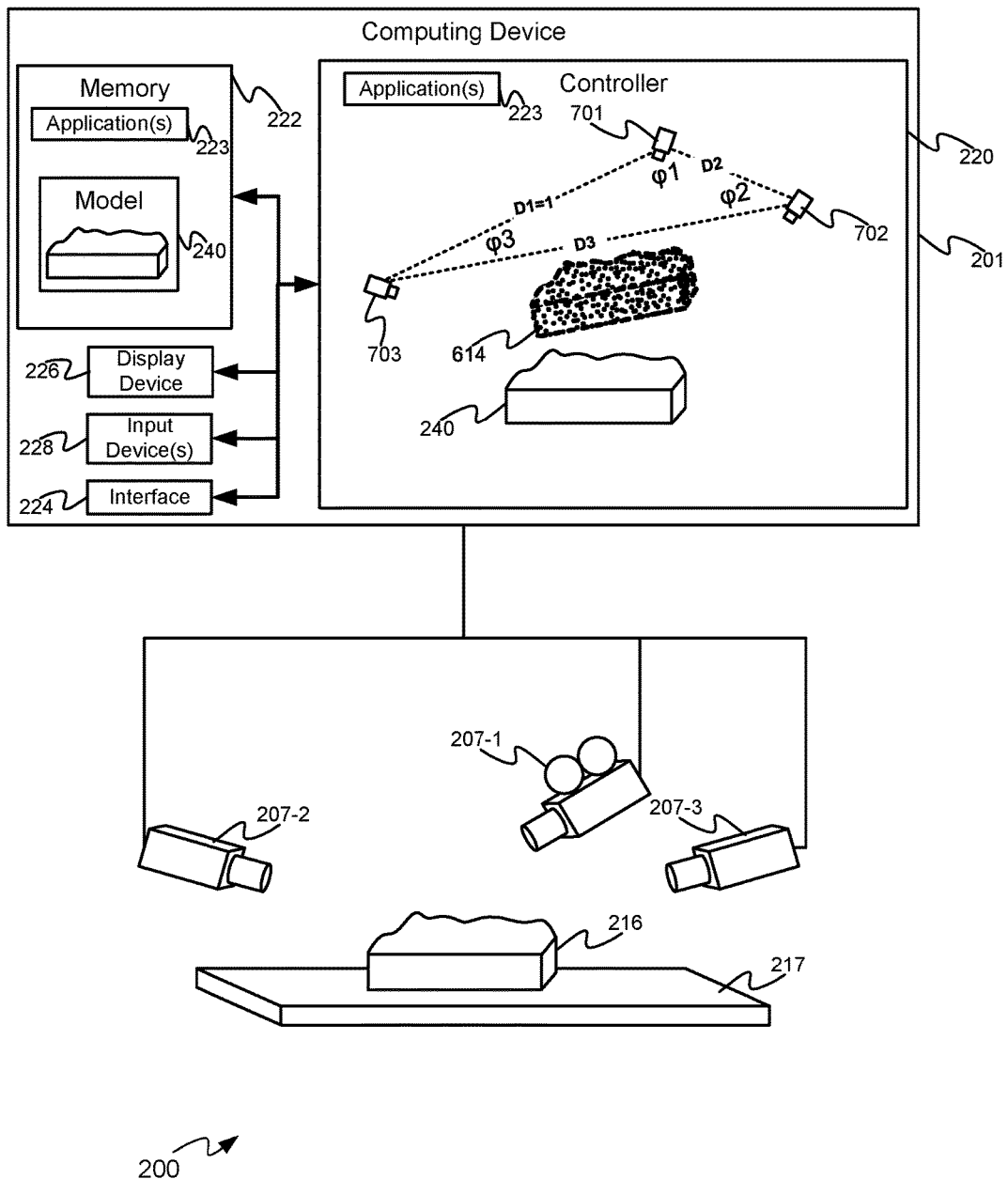
FIG. 7 depicts the system of FIG. 2 determining a sensed cloud-of-points of a physical object relative to the locations between the image devices, according to non-limiting embodiments.

Attention is next directed to FIG. 7 which depicts another aspect of an example embodiment of the block 308 of the method 300. In particular, at each vertex of the triangle a respective image device 207 is schematically depicted according to a respective pose 701, 702, 703. For example, the pose 701 represents the pose of the image device 207-1 in image device space (e.g. at the location of the vertex defined by distances D1, D2 and the angle $\varphi 1$ of the triangle, and having an orientation determined, for example, at the blocks 304, 306 of the method 300). Similarly, the pose 702 represents the pose of the image device 207-2 in image device space (e.g. at the location of the vertex defined by distances D2, D3 and the angle φ2 of the triangle, and having an orientation determined, for example, at the blocks 304, 306 of the method 300). Similarly, the pose 703 represents the pose of the image device 207-3 in image device space (e.g. at the location of the vertex defined by distances D1, D3 and the angle φ3 of the triangle, and having an orientation determined, for example, at the blocks 304, 306 of the method 300).

Also depicted in FIG. 7 is a sensed cloud-of-points 614 determined from the pixel correspondences determined at the block 302, and as described above. The sensed cloud-of-points 614 generally represents the physical object 216 as sensed by the image devices 207, and the location of the sensed cloud-of-points 614 is in image device space, as determined relative to the image devices 207.

Also depicted in FIG. 7 is a graphical depiction of the model 240 of the physical object 216 retrieved by the controller 220 from the memory 222.

Figure 8:
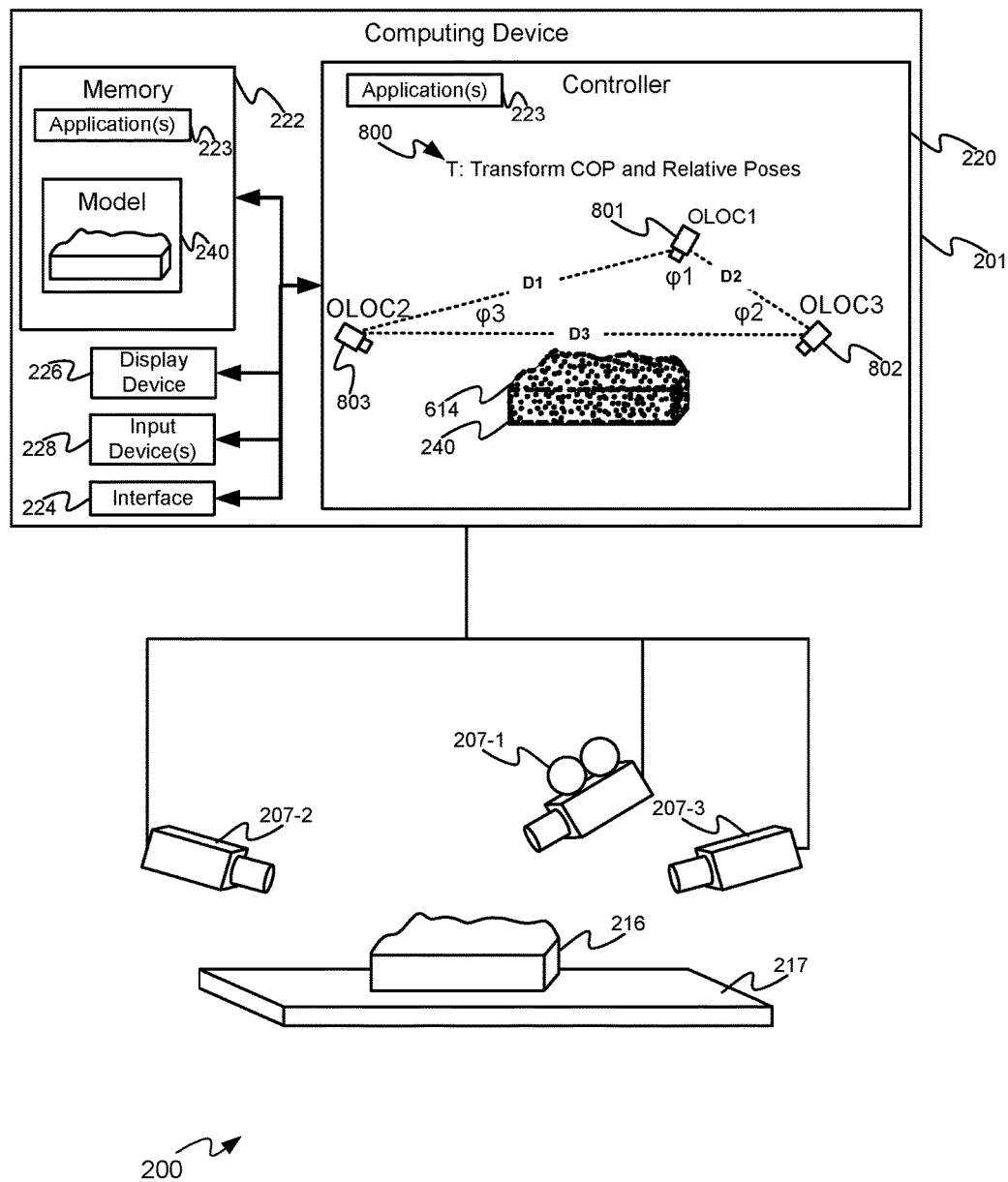
FIG. 8 depicts the system of FIG. 2 aligning a model of the physical object and the sensed cloud-of-points according to a first mode of operation, as well as determining the locations and poses of the image devices relative to the model and/or the physical object the according to non-limiting embodiments.

Attention is next directed to FIG. 8 which depicts an example embodiment of the block 310 of the method 300. Comparing FIG. 8 to FIG. 7, in FIG. 8 the controller 220 has aligned the model 240 and the sensed cloud-of-points 614 such that, for example, surfaces and/or features and the like of the model 240 and the sensed cloud-of-points 614 align. In particular, the controller 220 may rotate, translate and/or scale the model 240 and the sensed cloud-of-points 614 relative to each other to align the model 240 and the sensed cloud-of-points 614.

From the alignment, a transform 800 may be determined which represents the rotation, translation and/or scaling that may be performed on the sensed cloud-of-points 614 to align the sensed cloud-of-points 614 with the model 240. The same transform 800 is applied to the relative poses 701, 702, 703 of the image devices 207 to determine respective poses 801, 802, 803 of the image devices 207 relative to the model 240 and hence relative to the physical object 216. Put another way, the relative poses 701, 702, 703 of the image devices 207 are rotated, translated and/or scaled in the same manner as the sensed cloud-of-points 614 while maintaining the relative distances D1, D2, D3 therebetween. The transform 800 hence may comprise a matrix of values which, when applied to the relative poses 701, 702, 703, transforms the relative poses 701, 702, 703 to the respective poses 801, 802, 803 of the image devices 207 relative to the model 240 and hence relative to the physical object 216.

Hence, in FIG. 8, as depicted each of the distances D1, D2, D3 represent scaled actual distances between the image devices 207 that result from the relative poses 701, 702, 703 being transformed to the respective poses 801, 802, 803 using the transform 800 (e.g. similar to the sensed cloud-of-points 614 being transformed to align with the model 240). Indeed, as the model 240 includes physical dimensions of the physical object 216, the transformed poses 801, 802, 803 represent the real-world locations OLOC1, OLOC2, OLOC3, and orientations of the image devices 207 relative to the physical object 216.

Hence, using the poses 801, 802, 803, the projector of the image devices 207 (e.g. the image devices 207-1 and/or the projector 107) may be controlled by providing at least the pose 801 of the projector (e.g. as the pose data 109p) to the rendering device 101 (and/or the device 108) of the system 100 such that the projection data 112 may be generated and used to control the projector 107 to projection map, for example onto the physical object 216.

Indeed, returning briefly to FIG. 1, the alignment system 105 providing the pose data 109p to the rendering device 101 (and/or the device 108) generally represents an example embodiment of the block 312 of the method 300, as the alignment system 105 (embodied in the system 200) is causing the projector 107 to be controlled to project, for example onto the physical object 216, based at least on the respective location relative to the model 240 of each of the at least three image devices 207, for example by providing the pose data 109p (and in particular the pose data 801 of the projector of the image devices 207-1). In some embodiments, the sensed cloud-of-points 614 and/or the model 240 may be provided as the object data 109o, however, in general, the system 100 may have already been preconfigured with the model 240, for example as saved in a memory of the rendering device 101 and/or the device 108 and/or another memory of the system 100.

Heretofore, the first mode of operation of the system 200 and/or the computing device 201 has been described. In particular, the calibration of image devices 207 occurs in a fully automatic mode.

However, in the second mode of operation of the system 200 and/or the computing device 201, the alignment of the model 240 and the sensed cloud-of-points 614 may occur at least partially based on input received at the input device 228.

Figure 9:
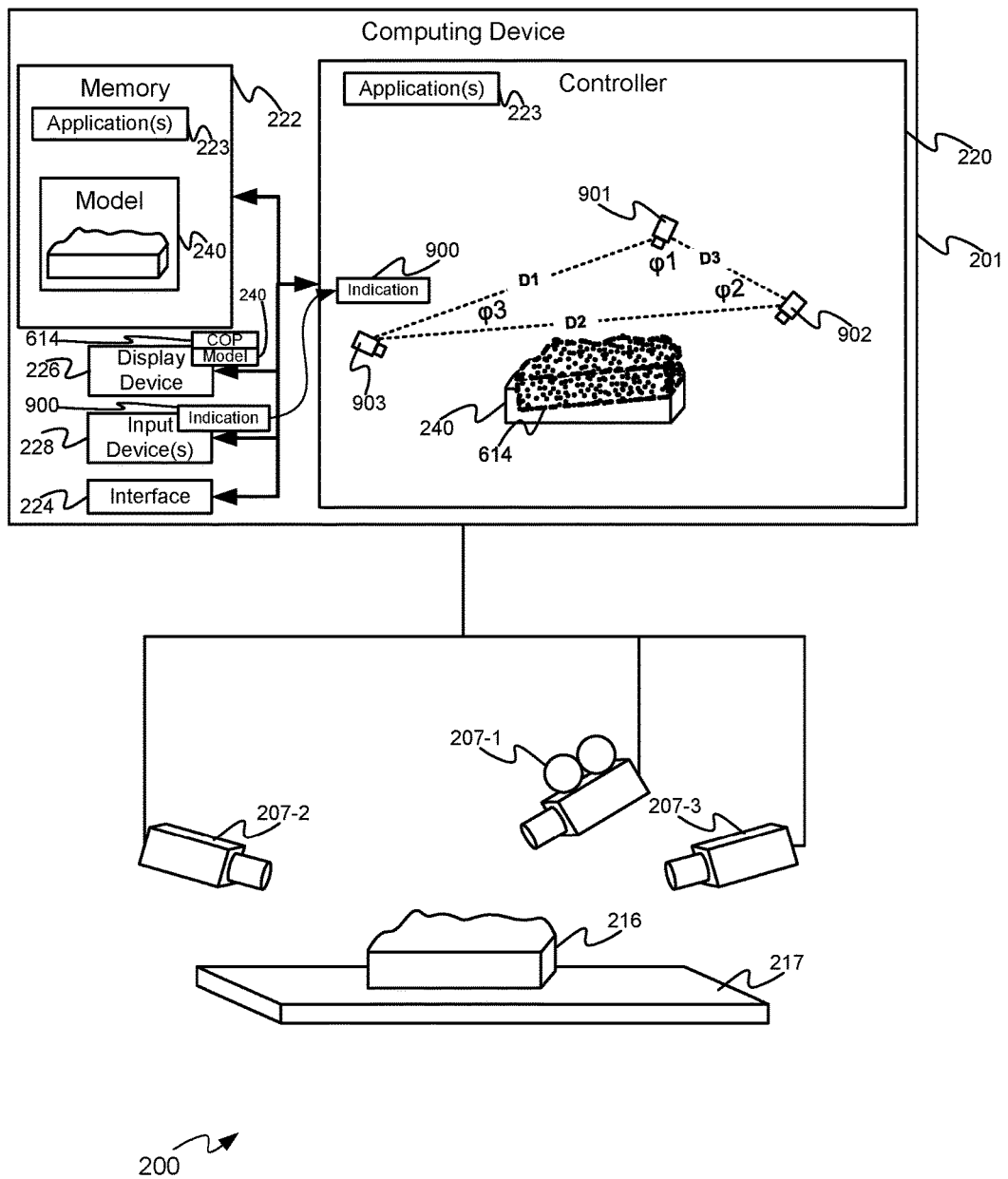
FIG. 9 depicts the system of FIG. 2 performing an initial alignment a model of the physical object and the sensed cloud-of-points according to a second mode of operation, according to non-limiting embodiments.

For example, attention is next directed to FIG. 9 which depicts an example embodiment of the second mode of operation of the system 200 and/or the computing device 201. In particular, a person of skill in the art will understand that in FIG. 9, the controller 220 has implemented the blocks 302, 304, 306, 308 of the method 300, and that FIG. 9 depicts an example alternative embodiment of the block 310 of the method 300. In particular, in FIG. 9, the input device 228 is receiving an indication 900 of an initial alignment between the model 240 and the sensed cloud-of-points 614. For example, the model 240 and the sensed cloud-of-points 614 may be rendered at the display device 226 in a visualization of the model 240 and the sensed cloud-of-points 614 and/or in a graphic user interface of the model 240 and the sensed cloud-of-points 614.

A user may then "manipulate" one or more of the model 240 and the sensed cloud-of-points 614 rendered at the display device 226 using the input device 228, for example, by one or more of rotating, translating and scaling the model 240 and/or the sensed cloud-of-points 614 to approximately align the model 240 and the sensed cloud-of-points 614. The indication 900 represents such manipulation as well as an initial transformation of the sensed cloud-of-points relative to the model 240. As depicted, the respective poses 901, 902, 903 of the image devices 207 represent initial transformed poses of the image devices 207 transformed using the indication 900 in the same manner as the sensed cloud-of-points 614.

Once the initial alignment is performed via the indication 900, the controller 220 automatically completes the alignment of the model 240 and the sensed cloud-of-points 614 as depicted in FIG. 8; in these embodiments, the transform 800 represents a combination of the indication 900 and the additional alignment completed by the controller 220.

Figure 10:
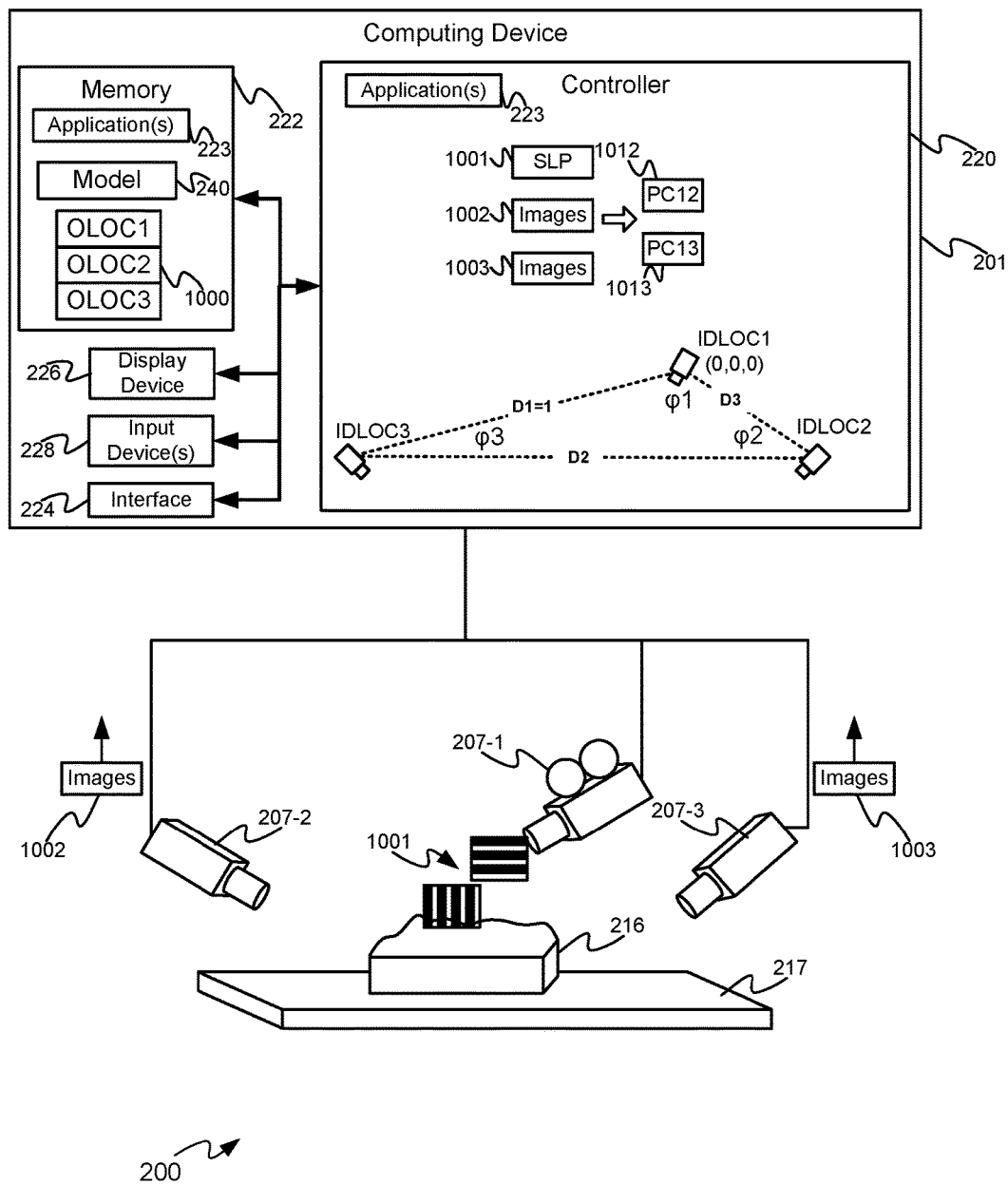
FIG. 10 depicts the system of FIG. 2 determining pixel correspondences between image devices according to a third mode of operation where the locations of the image devices relative to the physical object are predetermined, according to non-limiting embodiments.
Figure 11:
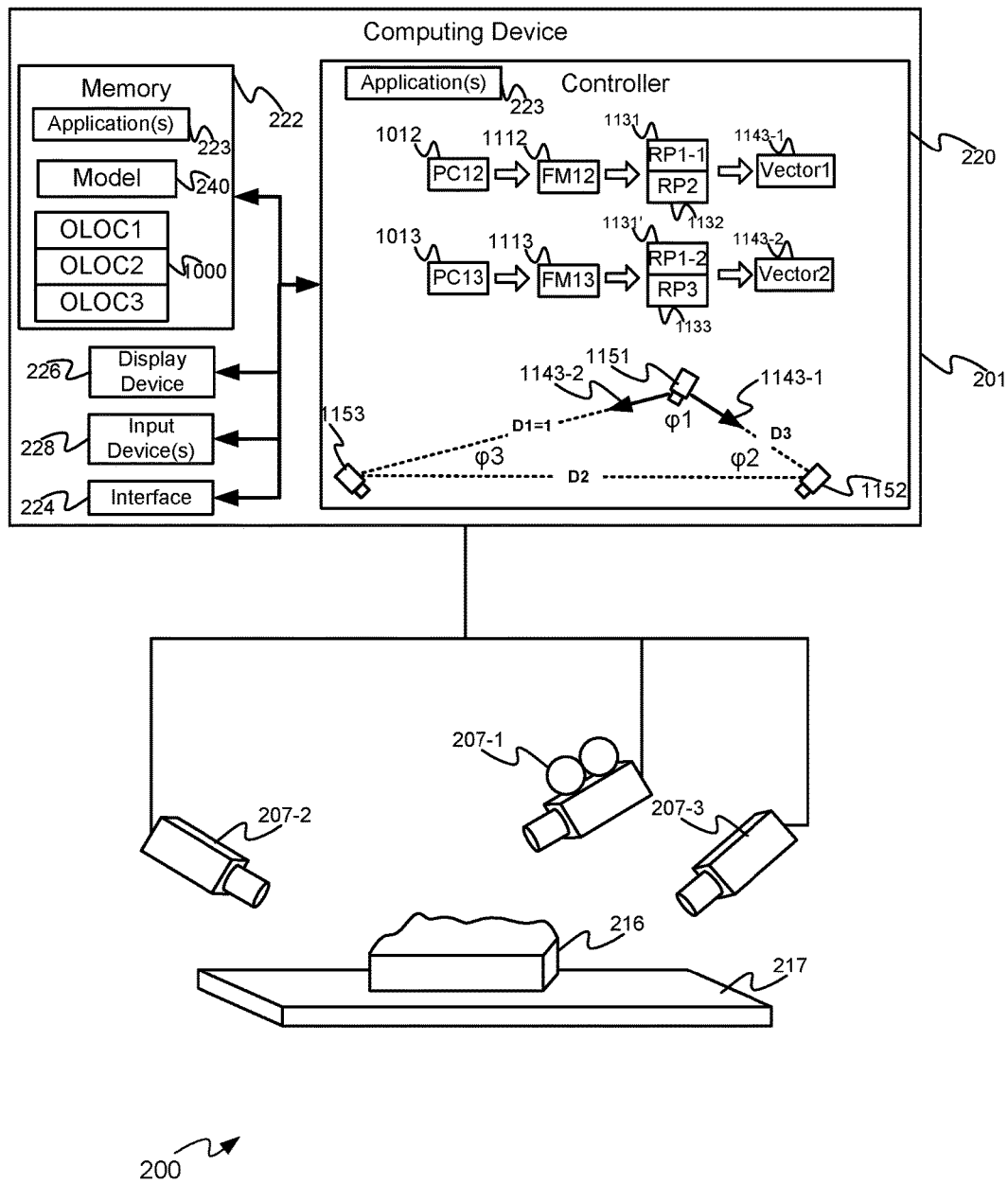
FIG. 11 depicts the system of FIG. 2 determining poses of the image devices relative to the physical object from the pixel correspondences according to the third mode of operation where the locations are predetermined, according to non-limiting embodiments.
Figure 12:
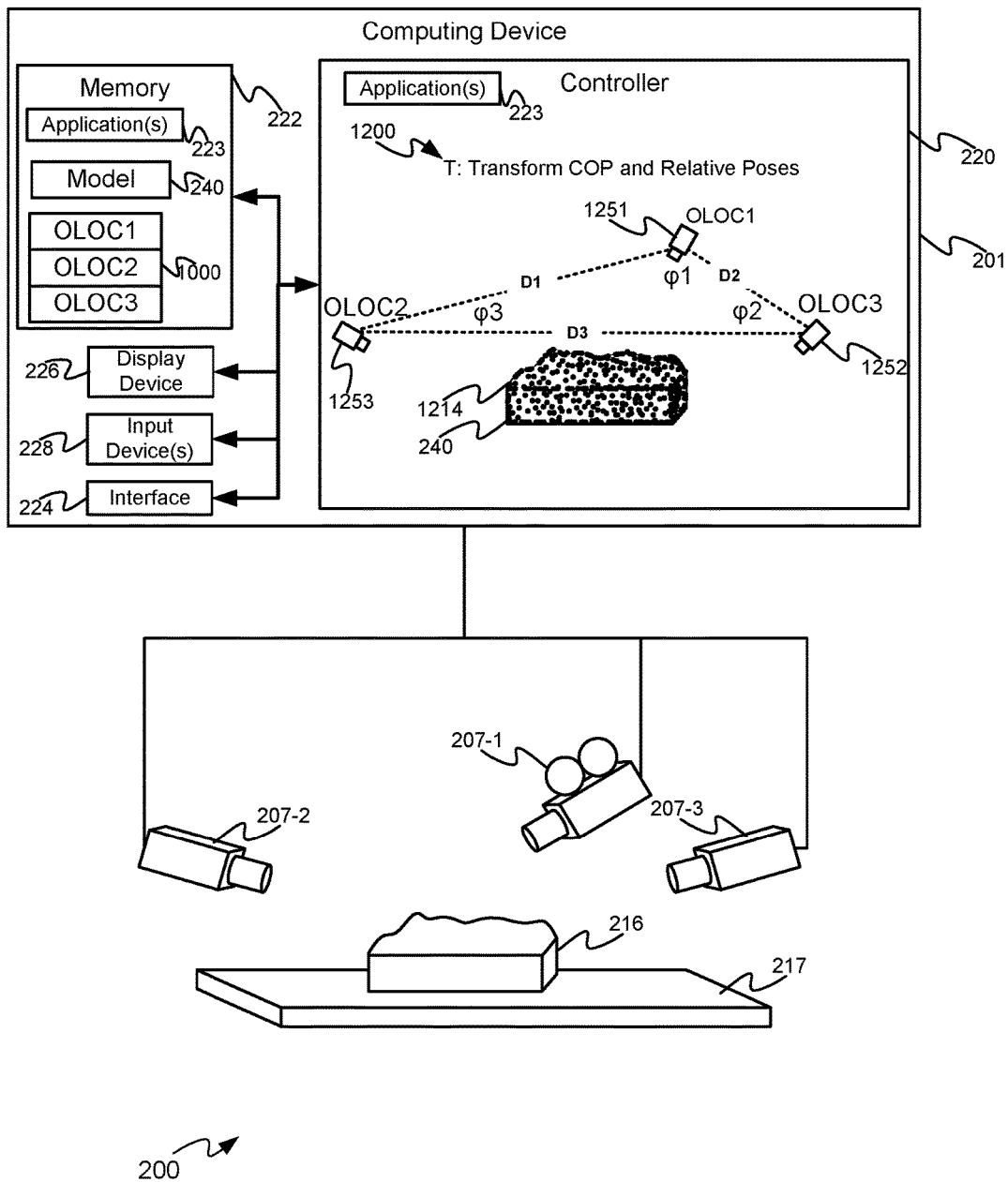
FIG. 12 depicts the system of FIG. 2 aligning a model of the physical object and a sensed cloud-of-points according to the third mode of operation, as well as determining the poses of the image devices relative to the model and/or the physical object the according to non-limiting embodiments.

Attention is next directed to FIG. 10, FIG. 11 and FIG. 12 which depicts an example embodiment of the third mode of operation of the system 200 and/or the computing device 201.

For example, attention is next directed to FIG. 10 which is substantially similar to FIG. 8 with like elements having like numbers. In particular, in FIG. 10, the locations 1000 of each of the image devices 207 relative to the physical object 216 have been determined, either using the method 300 or another technique (including, but limited to manual techniques), and stored in the memory 222. For example, OLOC1 is the location of the image device 207-1, OLOC2 is the location of the image device 207-2, and OLOC3 is the location of the image device 207-3. Hence, the distances D1, D2, D3 are known, as are the angles φ1, φ2, φ3. However, in FIG. 10, the orientation of the image devices 207 are unknown; furthermore, the relative vectors between the image devices 207 are generally unknown, for example relative to the changed orientations of the image device 207.

Furthermore, it is assumed in FIG. 10 that the field of view of only two pairs of the three image devices 207 partially overlap. In particular, the field of view of the projector (e.g. the image device 207-1) overlaps with the field of view of each of the cameras (e.g. the image devices 207-2, 207-3), but the field of views of the cameras do not overlap. In general, in the third mode of operation, any cameras of the image devices 207 are assumed to overlap with a field of view of a projector of the image devices to determine pixel correspondences between the projector and a camera, but the camera fields of view need not overlap; similarly, when projector fields of view overlap, but there is no overlap of the projector fields of view with camera fields of view, the physical object 216 may be at least temporarily provided with a grid (and the like) of light sensors (e.g. light sensing diodes, and the like) in communication with the computing device 201, to determine pixel correspondences between the two projectors.

As depicted, the projector (e.g. the image device 207-1) is projecting structured light patterns 1001 onto the physical object 216 and each of the cameras (e.g. the image device 207-1) are returning images 1002, 1003, similar to the structured light patterns 401 and the images 402, 403 as described with reference in FIG. 4. Also, similar to FIG. 4 and the block 302 of the method 300, using the structured light patterns 1001 and the images 1002, 1003, the controller 220 is determining pixel correspondences 1012 between the image devices 207-1, 207-2 and pixel correspondences 1013 between the image devices 207-1, 207-3. There are no pixel correspondences between the image devices 207-2, 207-3 as their fields of view do not overlap.

Attention is next directed to FIG. 11 which depicts the controller 220 using the pixel correspondences 1012 between the image devices 207-1, 207-2 to construct a Fundamental Matrix 1112 therebetween. Similarly, the controller 220 is using the pixel correspondences 1013 between the image devices 207-1, 207-3 to construct a Fundamental Matrix 1113 therebetween.

Furthermore, the controller 220 derives the relative poses 1131, 1132 of each of the image devices 207-1, 207-2 in the first image device space, from the Fundamental Matrix 1112. Similarly, the controller 220 derives the relative poses 1131', 1133 of each of the image devices 207-1, 207-3 in the first image device space, from the Fundamental Matrix 1113. From the relative poses 1131, 1132 of each of the image devices 207-1, 207-2 in the first image device space, the controller 220 determines the relative vector 1143-1 therebetween in the first image device space. Similarly, from the relative poses 1131', 1133 of each of the image devices 207-1, 207-3 in the first image device space, the controller 220 determines the relative vector 1143-2 therebetween in the first image device space. In general, assuming that the first image device 207-1 is at the origin of the first image device space, the poses 1131, 1131' will be the same and hence will be interchangeably referred to hereafter as the pose 1131 of the first image device 1131. To this point, the relative distances and/or relative locations between the image devices 207 has not been determined from the poses 1131, 1132, 1133.

However, as the locations 1000 of each of the image devices 207 relative to the physical object 216 was previously determined the relative distances D1, D2, D3 therebetween may be determined from the locations 1000. Furthermore, as the relative distances D1, D2, D3 may be determined from the locations 1000, the respective relative poses 1151, 1152, 1153 of each of the image devices 201-1, 207-2, 207-3 may also be determined, which includes relative locations.

With reference to FIG. 12, the controller 220 may then determine a transform 1200 to align a sensed cloud-of-points 1214 and the model 240, the transform 1200 also used to transform the poses 1151, 1152, 1153 in the first image space to respective poses 1251, 1252, 1253 relative to the model 240 and hence the physical object 216, the respective poses 1251, 1252, 1253 include the respective locations 1000. For example, using the transform 1200, the controller 220 determines that the first image device 207-1 has a pose 1251, relative to the physical object 216, and is located at the location OLOC1; similarly, the controller 220 determines that the second image device 207-2 has a pose 1252, relative to the physical object 216, and is located at the location OLOC2; and similarly, the controller 220 determines that the third image device 207-3 has a pose 1253, relative to the physical object 216, and is located at the location OLOC3.

As with the first mode and the second mode of operation, an order in which the image devices 207 are calibrated in the third mode may be based on a number of the pixel correspondences. For example, when a number of the pixel correspondences 1012 is larger than a number of the pixel correspondences 1013, the Fundamental Matrix 1112 may be determined first, and the Fundamental Matrix 1113 may be determined second.

Indeed, in each of the modes, an order in which the at least three image devices 207 are calibrated may depend on one or more of a number or pixel correspondences between two image devices 207 and/or a number of overlapping fields of view of any given image device 207. However, it is further understood by a person of skill in the art that order in which the at least three image devices 207 are calibrated further depend on the at least three image devices being in a non-collinear and/or triangular arrangement, as described above. For example, when image devices 207 are calibrated and angles between the respective relative vectors of a triplet of image devices 207 are all determined to be "0" degrees or "180" degrees, the controller 220 may discard the triplet as the triangular condition is not met, and select other image devices 207 for calibration.

Figure 13:
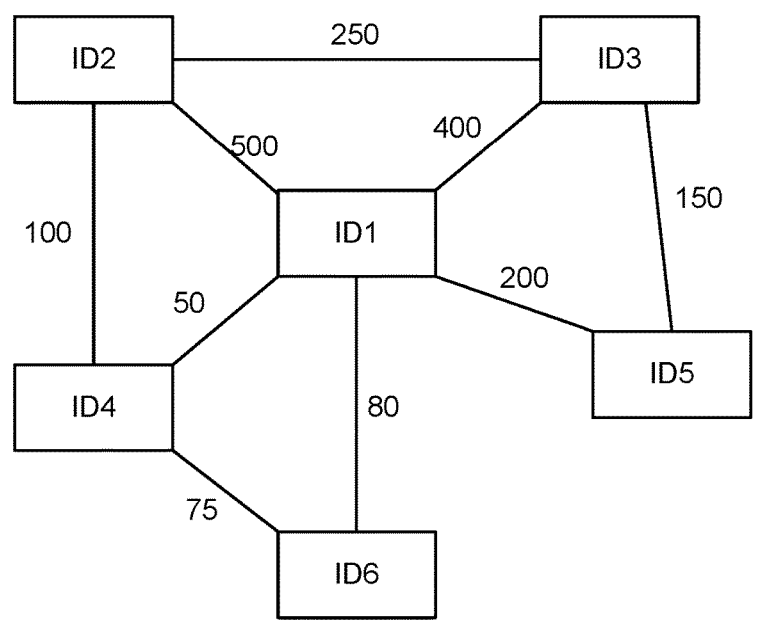
FIG. 13 depicts a plurality of image devices in a tree structure, according to non-limiting embodiments.

Attention is next directed to FIG. 13 which schematically depicts six image devices ID1, ID2, ID3, ID4, ID5, ID6 in which image devices having overlapping fields of view are represented by lines therebetween, and numbers of pixel correspondences of the image devices having overlapping fields of view are represented by numbers beside each line. It is assumed in these embodiments that each of the image devices ID1, ID2, ID3, ID4, ID5, ID6 has an overlapping field of view with at least two others of the image devices ID1, ID2, ID3, ID4, ID5, ID6. In other words, the image devices of FIG. 13 may have a similar configuration to the image devices 207 of FIG. 4, but with six image devices instead of three image devices, and with triplets of the image devices ID1, ID2, ID3, ID4, ID5, ID6 having overlapping fields of view, but not all fields of view of the image devices ID1, ID2, ID3, ID4, ID5, ID6 overlap.

Put yet another way, each image device of FIG. 13 generally has an overlapping field of view with two others of the image devices. Hence, for example, the image device ID1 has overlapping fields of view with all the other image devices ID2, ID3, ID4, ID5, ID6, while the image device ID6 has overlapping fields of view only with the image devices ID1, ID4.

Furthermore, the number of pixel correspondences between the image devices ID1, ID2 is 500 while the number of pixel correspondences between the image devices ID2, ID3 is 250.

In the embodiments, computer science terminology of graphs and/or trees may be used to describe the relationships between the image devices ID1, ID2, ID3, ID4, ID5, ID6. For example, each line between two image devices (presuming pixel correspondences therebetween) may be referred to as an "edge" while each image device may be referred to as a "vertex". The number of pixel correspondences of each edge may be referred to as a "weight" of an edge. The order in which the image devices are calibrated may be referred to as a "tree".

In general, the controller 220 and/or the computing device 201, when determining an order in which to calibrate the image devices ID1, ID2, ID3, ID4, ID5, ID6 may first select the vertex that has the most edges, for example the image device ID1, and then select the triplet that includes the imaged device ID1 that has the most pixel correspondences and/or the edges that include the image device ID1 that have the highest weights, for example the edges between the image devices ID1, ID2, ID3.

Once the relative poses are determined for the image devices ID1, ID2, ID3, including the relative locations therebetween (e.g. as described above with respect to FIG. 4, FIG. 5 and FIG. 6), a next vertex is selected for calibration having edges connected to two of the image devices ID1, ID2, ID3 already calibrated, and having the highest weights. For example, the image device ID5 shares two edges with the image devices ID1, ID2, ID3 and the image device ID4 also shares two edges with the image devices ID1, ID2, ID3. However, as the weights of the edges of the image device ID5 have higher weights than the weights of the edges of the image device ID4, the image device ID5 is next calibrated using the triplet ID1, ID3, ID5. Indeed, as the relative locations of the image devices ID1, ID3 have already been determined, relative location of the image device ID5 is determined relative to each of the image devices ID1, ID3.

Once the image device ID5 is calibrated, a next vertex is selected for calibration having edges connected to two of the image devices ID1, ID2, ID3, ID5 already calibrated and having the highest weights. For example, the image device ID6 shares two edges with the image devices ID1, ID2, ID3, ID5 and the image device ID4 also shares two edges with the image devices ID1, ID2, ID3, ID5. However, as the weights of the edges of the image device ID4 have higher weights than the weights of the edges of the image device ID6, the image device ID4 is next calibrated using the triplet ID1, ID2, ID4. Indeed, as the relative locations of the image devices ID1, ID2 have already been determined, relative location of the image device ID4 is determined relative to each of the image devices ID1, ID2.

Finally, the last remaining image device ID6 is calibrated, however when there are more than six image devices, the selection of a next image device to calibrate may continue in this manner until a tree is constructed that includes all the image devices. Hence, when the system 200 is operated according to the first mode or the second mode any image device added to the system 200 may be calibrated based on pixel correspondences with at least two other image devices in the system 200.

While an order of calibration may be based on a number of "edges" of each of the image devices, and/or a weight of each edge, any suitable technique may be used to determine an order of calibration. For example, in some embodiments, selecting a next image device to calibrate may be based on which of the uncalibrated image devices, that have edges with two previously calibrated image devices, in turn have the most edges with further uncalibrated image devices. In these embodiments, once the image devices ID1, ID2, ID3 are calibrated, the next image device to be calibrated is image device ID4 has it has edges with another uncalibrated image device ID6, while the image device ID5 has no edges with uncalibrated image devices.

A person of skill in the art will understand that the order in which a set of image devices is calibrated is further dependent on triplets of the image devices meeting the triangular condition. Hence when a triplet of image devices is initially selected based on weights of edges and the like, and/or a next image device is selected based on selected based on weights of edges and the like, the triplet and/or the next image device may be discarded from a current calibration determination when it is determined that the triplet and/or the next image device does not meet the triangular condition (e.g. the angles between image devices in a triplet are all 0 degrees and/or 180 degrees). However, image devices that are discarded from a current calibration determination may be calibrated against other image devices in the set where the triangular condition is met. Put another way, calibration of image devices that are determined to not meet the triangular condition may occur later in the order in which a set of image devices is calibrated.

When the system 200 is operated according to the third mode, construction of a tree may occur in a similar manner, however each vertex/image device need share an edge with only one other vertex/image device, and next vertex/image device is selected for calibration having an edge connected to one of the image devices already calibrated and having the highest weight. In these instances, the triangular condition need not be met.

Provided herein is a device, system and method for automatic calibration of image devices which may be used in a projection mapping system, for example to obviate use of a technician to perform a laborious manual calibration.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some embodiments, the terms are understood to be "within 10%," in other embodiments, "within 5%", in yet further embodiments, "within 1%", and in yet further embodiments "within 0.5%".

Persons skilled in the art will appreciate that in some embodiments, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other embodiments, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative embodiments and modifications possible, and that the above examples are only illustrations of one or more embodiments. The scope, therefore, is only to be limited by the claims appended hereto.

What is claimed is:

1. A system comprising:
   at least three image devices, with triplets of the at least three image devices in non-collinear arrangements, the at least three image devices including a projector configured to project onto a physical object, others of the at least three image devices each comprising a respective camera or a respective projector, wherein pairs of the at least three image devices have at least partially overlapping fields of view on the physical object;
   a memory storing a model of the physical object including physical dimensions thereof; and
   a controller configured to:
      determine respective pixel correspondences between the pairs of the at least three image devices as the projector is projecting structured light onto the physical object;
      determine a respective relative vector between a first pair of the at least three image devices using the respective pixel correspondences therebetween;
      determine respective relative vectors between further image devices, of the at least three image devices, and any two of the at least three image devices that share pixel correspondences with the further image devices and for which the respective relative vector has already been determined, until the respective relative vectors between all of the at least three image devices are determined;
      determine a respective relative location between each of the at least three image devices based on the respective relative vectors between the at least three image devices, setting a relative distance between one pair of the at least three image devices to an arbitrary distance, the respective relative location of each of the at least three image devices being further relative to a sensed cloud-of-points representing the physical object;
      align the model and the sensed cloud-of-points to transform the respective relative location of each of the at least three image devices to a respective location relative to the model; and
      cause controlling of the projector to project onto the physical object based at least on the respective location relative to the model of each of the at least three image devices.

2. The system of claim 1, wherein the controller is further configured to one or more of:
   use the respective pixel correspondences between the pairs of the at least three image devices to construct one or more of respective Fundamental Matrices and respective Essential Matrices therebetween, the respective relative vectors being derived from one or more of the respective Fundamental Matrices and the respective Essential Matrices; and
   use the respective pixel correspondences between the pairs of the at least three image devices as input to a function from which the respective relative vectors are derived.

3. The system of claim 1, wherein the controller is further configured to:
   when determining the respective relative vectors, determine, using the respective pixel correspondences, a respective relative pose of each of the at least three image devices, the respective relative pose including the respective relative vectors;
   when aligning the model and the sensed cloud-of-points, transform the respective relative pose of each of the at least three image devices to a respective pose relative to the model; and
   cause controlling of the projector to project onto the physical object based on the respective location and the respective pose relative to the model of each of the at least three image devices.

4. The system of claim 3, wherein the controller is further configured to, when an orientation of one or more of the at least three image devices changes and respective locations remain within a given range:
   again determine the respective pose of each of the at least three image devices based on the respective location relative to the model of each of the at least three image devices.

5. The system of claim 1, further comprising an input device, and wherein the controller is further configured to align the model and the sensed cloud-of-points by:
   receiving, from the input device, an indication of an initial alignment between the model and the sensed cloud-of-points; and
   automatically completing aligning the model and the sensed cloud-of-points from the initial alignment.

6. The system of claim 1, wherein the controller is further configured to align the model and the sensed cloud-of-points one or more of:

automatically;

using automated feature detection; and using model recognition.

7. The system of claim 1, wherein the controller is further configured to:

refine one or more of the respective relative vector and the respective relative location of each of the at least three image devices using Bundle Adjustment.

8. The system of claim 1, wherein the controller is further configured to:

select the first pair of the at least three image devices based on numbers of pixel correspondences between the at least three image devices.

9. The system of claim 1, wherein the controller is further configured to:

select the further image devices, of the at least three image devices, based on numbers of pixel correspondences between the at least three image devices.

10. The system of claim 1, wherein the controller is further configured to:

repeat determining the respective pixel correspondences, the respective relative vectors and the respective relative locations for a number of image devices greater than three.

11. A method comprising:

determining, at a computing device, respective pixel correspondences between pairs of at least three image devices as a projector, of the at least three image devices, is projecting structured light onto a physical object; triplets of the at least three image devices being in non-collinear arrangements, the at least three image devices including the projector configured to project onto the physical object, others of the at least three image devices each comprising a respective camera or a respective projector, and pairs of the at least three image devices having at least partially overlapping fields of view on the physical object;

determining, at the computing device, a respective relative vector between a first pair of the at least three image devices using the respective pixel correspondences therebetween;

determining, at the computing device, respective relative vectors between further image devices, of the at least three image devices, and any two of the at least three image devices that share pixel correspondences with the further image devices and for which the respective relative vector has already been determined, until the respective relative vectors between all of the at least three image devices are determined;

determining, at the computing device, a respective relative location between each of the at least three image devices based on the respective relative vectors between the at least three image devices, setting a relative distance between one pair of the at least three image devices to an arbitrary distance, the respective relative location of each of the at least three image devices being further relative to a sensed cloud-of-points representing the physical object;

aligning, at the computing device, a model of the physical object and the sensed cloud-of-points to transform the respective relative location of each of the at least three image devices to a respective location relative to the model, the model of the physical object including physical dimensions thereof; and causing, at the computing device, controlling of the projector to project onto the physical object based at least on the respective location relative to the model of each of the at least three image devices.

12. The method of claim 11, further comprising one or more of:

using the respective pixel correspondences between the pairs of the at least three image devices to construct one or more of respective Fundamental Matrices and respective Essential Matrices therebetween, the respective relative vectors being derived from one or more of the respective Fundamental Matrices and the respective Essential Matrices; and using the respective pixel correspondences between the pairs of the at least three image devices as input to a function from which the respective relative vectors are derived.

13. The method of claim 11, further comprising:

when determining the respective relative vectors, determining, using the respective pixel correspondences, a respective relative pose of each of the at least three image devices, the respective relative pose including the respective relative vectors;

when aligning the model and the sensed cloud-of-points, transforming the respective relative pose of each of the at least three image devices to a respective pose relative to the model; and causing controlling of the projector to project onto the physical object based on the respective location and the respective pose relative to the model of each of the at least three image devices.

14. The method of claim 13, further comprising, when an orientation of one or more of the at least three image devices changes and respective locations remain within a given range:

again determining the respective pose of each of the at least three image devices based on the respective location relative to the model of each of the at least three image devices.

15. The method of claim 11, further comprising aligning the model and the sensed cloud-of-points by:

receiving, from an input device, an indication of an initial alignment between the model and the sensed cloud-of-points; and automatically completing aligning the model and the sensed cloud-of-points from the initial alignment.

16. The method of claim 11, further comprising aligning the model and the sensed cloud-of-points one or more of:

automatically;

using automated feature detection; and using model recognition.

17. The method of claim 11, further comprising:

refining one or more of the respective relative vector and the respective relative location of each of the at least three image devices using Bundle Adjustment.

18. The method of claim 11, further comprising:

selecting the first pair of the at least three image devices based on numbers of pixel correspondences between the at least three image devices.

19. The method of claim 11, further comprising:

selecting the further image devices, of the at least three image devices, based on numbers of pixel correspondences between the at least three image devices.

20. The method of claim 11, further comprising:

repeating determining the respective pixel correspondences, the respective relative vectors and the respective relative locations for a number of image devices greater than three.

* * * * *